: US 9,023,742 B2
(45) Date of Patent: May 5, 2015

(12) United States Patent
Saitou et al.

(54) PHOTOCATALYTIC COATING, PHOTOCATALYTIC COATING FILM AND LAMINATED COATING FILM STRUCTURE

(75) Inventors: Nobuo Saitou, Fukuoka (JP); Tohru Kitamura, Osaka (JP); Teruki Matsukawa, Osaka (JP); Teruhisa Ohno, Fukuoka (JP)

(73) Assignees: Metaltech Co., Ltd., Fukuoka (JP); Kyushu Institute of Technology, Fukuoka (JP); Nobuo Saitou, Fukuoka (JP)

( * ) Notice: Subject to any disclaimer, the term of this patent is extended or adjusted under 35 U.S.C. 154(b) by 250 days.

(21) Appl. No.: 13/123,515

(22) PCT Filed: Feb. 3, 2011

(86) PCT No.: PCT/JP2011/052217
§ 371 (c)(1),
(2), (4) Date: Apr. 8, 2011

(87) PCT Pub. No.: WO2011/129138
PCT Pub. Date: Oct. 20, 2011

(65) Prior Publication Data
US 2012/0142238 A1    Jun. 7, 2012

(30) Foreign Application Priority Data
Apr. 12, 2010  (JP) .......................... PCT/JP10/56547

(51) Int. Cl.
*B32B 5/02* (2006.01)
*B32B 27/04* (2006.01)
(Continued)

(52) U.S. Cl.
CPC ............... *B01J 21/063* (2013.01); *B01J 23/72* (2013.01); *B01J 35/004* (2013.01);
(Continued)

(58) Field of Classification Search
USPC .............................. 442/59; 428/421; 502/159
See application file for complete search history.

(56) References Cited

U.S. PATENT DOCUMENTS 6,335,061 B1 *   1/2002  Kanamori et al. ............ 427/515
2008/0081758 A1 * 4/2008  Kuroda et al. ................ 502/150
(Continued)

FOREIGN PATENT DOCUMENTS

JP    2001064583    3/2001
JP    2004127647    4/2004
(Continued)

OTHER PUBLICATIONS

PCT/JP2010/056547, International Search Report and Written Opinion mailed May 25, 2010 (6 pages—English; 9 pages—Japanese).

*Primary Examiner* — Elizabeth Cole
*Assistant Examiner* — Klee S Simmons
(74) *Attorney, Agent, or Firm* — Andrew F. Young, Esq.; Lackenbach Siegel, LLP

(57) ABSTRACT

Provided is a photocatalytic coating in which the coating per se is hardly eroded even when a photocatalyst is excited and a coating surface having strong hydrophobic tendency can be formed. The photocatalytic coating is prepared by dispersing or dissolving at least a photocatalyst, a tetrafluoro-ethylene-based resin obtained by graft polymerization of a sulfonic acid, a compound containing metal ion having an ionic radius not less than an ionic radius of calcium and/or complex ion having an ionic radius not less than the ionic radius of calcium into a solvent. Further, hydroxide is used as the compound containing the metal ion or an electrically neutral surfactant is added to the photocatalytic coating.

18 Claims, 14 Drawing Sheets

(51) Int. Cl.
*B01J 21/06* (2006.01)
*B01J 23/72* (2006.01)
*B01J 35/00* (2006.01)
*B01J 37/02* (2006.01)
*B01J 37/20* (2006.01)
*C09D 5/14* (2006.01)
*C09D 7/12* (2006.01)

(52) U.S. Cl.
CPC ......... *B01J 37/0201* (2013.01); *B01J 37/0215* (2013.01); *B01J 37/20* (2013.01); *C09D 5/14* (2013.01); *C09D 7/1216* (2013.01)

(56) References Cited

U.S. PATENT DOCUMENTS

2008/0124490 A1* 5/2008 Kobayashi .................... 427/597
2009/0142604 A1* 6/2009 Imai et al. .................... 428/447

FOREIGN PATENT DOCUMENTS

| JP | 2006233072 | 9/2006 |
| JP | 2006233073 | 9/2006 |
| JP | 2008222853 | 9/2008 |
| JP | 2009066594 | 4/2009 |

* cited by examiner

Fig. 2

NUMBER OF VIABLE BACTERIA UNDER TEST ILLUMINANCE=900LUX
LIGHT IRRADIATION CONDITION

| COATING CONDITION | $C_{900}$ | $R_{900}$ |
|---|---|---|
| (NAFION + 6%Cu CARRYING S-DOPED PHOTOCATALYST)-BASED COATING LIQUID IS APPLIED TO COATING OBJECT (COATING FILM THICKNESS : 1μ) | $2.0 \times 10^1$ | 4.0 |
| (NAFION + 6%Cu CARRYING S-DOPED PHOTOCATALYST)-BASED COATING LIQUID is APPLIED TO COATING OBJECT (COATING FILM THICKNESS : 5μ) | $1.0 \times 10^1$ | 4.3 |

DARK CONDITION

| COATING CONDITION | $C'_{900}$ | $R'_{900}$ |
|---|---|---|
| (NAFION + 6%Cu CARRYING S-DOPED PHOTOCATALYST)-BASED COATING LIQUID IS APPLIED TO COATING OBJECT (COATING FILM THICKNESS : 1μ) | $2.2 \times 10^4$ | 1.0 |
| (NAFION + 6%Cu CARRYING S-DOPED PHOTOCATALYST)-BASED COATING LIQUID is APPLIED TO COATING OBJECT (COATING FILM THICKNESS : 5μ) | $2.0 \times 10^1$ | 4.0 |

NUMBER OF VIABLE BACTERIA UNDER TEST ILLUMINANCE=200Lux
LIGHT IRRADIATION CONDITION

| COATING CONDITION | $C_{200}$ | $R_{200}$ |
|---|---|---|
| (NAFION + 6%Cu CARRYING S-DOPED PHOTOCATALYST)-BASED COATING LIQUID IS APPLIED TO COATING OBJECT (COATING FILM THICKNESS : 1μ) | $2.5 \times 10^1$ | 4.2 |
| (NAFION + 6%Cu CARRYING S-DOPED PHOTOCATALYST)-BASED COATING LIQUID IS APPLIED TO COATING OBJECT (COATING FILM THICKNESS : 5μ) | $1.0 \times 10^1$ | 4.6 |

DARK CONDITION

| COATING CONDITION | $C'_{200}$ | $R'_{200}$ |
|---|---|---|
| (NAFION + 6%Cu CARRYING S-DOPED PHOTOCATALYST)-BASED COATING LIQUID IS APPLIED TO COATING OBJECT (COATING FILM THICKNESS : 1μ) | $4.6 \times 10^4$ | 1.6 |
| (NAFION + 6%Cu CARRYING S-DOPED PHOTOCATALYST)-BASED COATING LIQUID IS APPLIED TO COATING OBJECT (COATING FILM THICKNESS : 5μ) | $3.7 \times 10^2$ | 3.7 |

Fig. 3

NUMBER of VIABLE BACTERIA UNDER TEST ILLUMINANCE=900LUX LIGHT IRRADIATION CONDITION

| COATING CONDITION | $C_{900}$ | $R_{900}$ |
|---|---|---|
| (NAFION + 6%Cu CARRYING S-DOPED PHOTOCATALYST)-BASED COATING LIQUID IS APPLIED TO COATING OBJECT (COATING FILM THICKNESS : 1μ) | $6.8 \times 10^3$ | 1.6 |
| (NAFION + 6%Cu CARRYING S-DOPED PHOTOCATAlyst)-BASED COATING LIQUID IS APPLIED TO COATING OBJECT (COATING FILM THICKNESS : 5μ) | $2.5 \times 10^2$ | 3.0 |

NUMBER of VIABLE BACTERIA UNDER TEST ILLUMINANCE=200LUX LIGHT IRRADIATION CONDITION

| COATING CONDITION | $C_{200}$ | $R_{200}$ |
|---|---|---|
| (NAFION + 6%Cu CARRYING S-DOPED PHOTOCATALYST)-BASED COATING LIQUID IS APPLIED TO COATING OBJECT (COATING FILM THICKNESS : 1μ) | $3.2 \times 10^5$ | 1.1 |
| (NAFION + 6%Cu CARRYING S-DOPED PHOTOCATALYST)-BASED COATING LIQUID IS APPLIED TO COATING OBJECT (COATING FILM THICKNESS : 5μ) | $2.0 \times 10^4$ | 1.1 |

R1 IS hydrogen OR METHYL GROUP. R2 IS AN ALKYL GROUP WITH CARBON NUMBER UP TO 4 OR AN ALKYL GROUP HAVING CARBON NUMBER OF 10 OR LESS, WHEREIN AN ALKYL GROUP END HAS A TRIMETHOXYSILYL GROUP OR A TRIETHOXYSILY GROUP AND IS EITHER EQUAL OR DIFFERENT IN TOTAL MOLECULES. N IS A NATURAL number UP TO 1000.

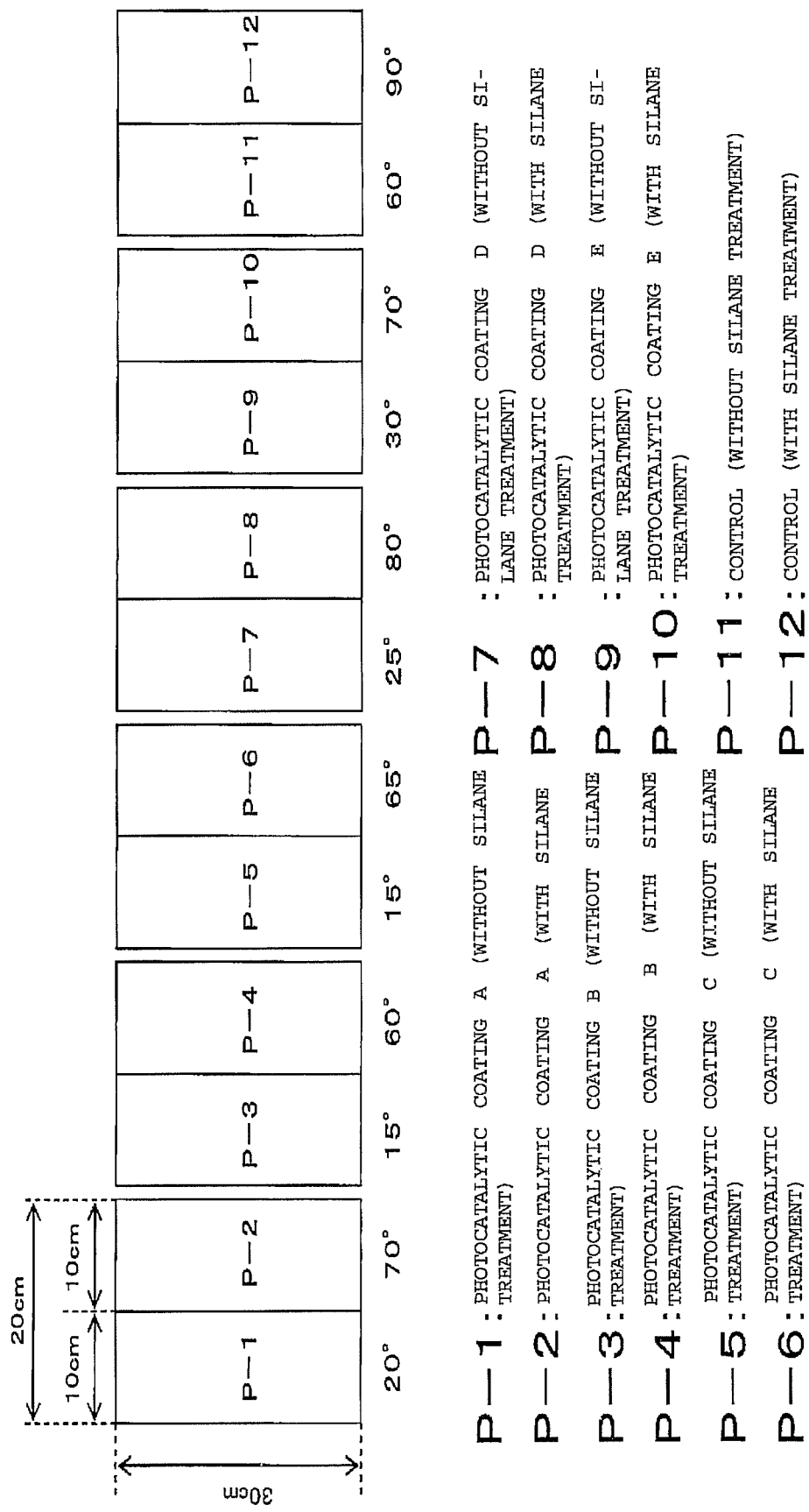

Fig. 10

NUMBER OF VIABLE BACTERIA UNDER TEST ILLUMINANCE=900LUX

LIGHT IRRADIATION CONDITION

| COATING CONDITION | $C_{900}$ | $R_{900}$ |
|---|---|---|
| (NAFION + 6%Cu CARRYING S-DOPED PHOTOCATALYST)-BASED COATING LIQUID IS APPLIED TO URETHANE COATING FILM (COATING FILM THICKNESS : 1μ) | $2.0 \times 10^1$ | 4.0 |
| (NAFION + 6%Cu CARRYING S-DOPED PHOTOCATALYST)-BASED COATING LIQUID IS APPLIED TO URETHANE COATING FILM (COATING FILM THICKNESS : 5μ) | $1.0 \times 10^1$ | 4.3 |
| (NAFION + 6%Cu CARRYING S-DOPED PHOTOCATALYST)-BASED COATING LIQUID IS APPLIED TO PAPER product (CORRESPONDING TO COATING FILM THICKNESS : 5μ) | $1.0 \times 10^1$ | 4.3 |
| (NAFION + 6%Cu CARRYING S-DOPED PHOTOCATALYST)-BASED COATING LIQUID IS APPLIED TO TEXTILE PRODUCT (CORRESPONDING TO COATING FILM THICKNESS : 5μ) | $2.0 \times 10^2$ | 3.0 |

DARK IRRADIATION CONDITION

| COATING CONDITION | $C'_{900}$ | $R'_{900}$ |
|---|---|---|
| (NAFION + 6%Cu CARRYING S-DOPED PHOTOCATALYST)-BASED COATING LIQUID IS APPLIED TO URETHANE COATING FILM (COATING FILM THICKNESS : 1μ) | $2.2 \times 10^4$ | 1.0 |
| (NAFION + 6%Cu CARRYING S-DOPED PHOTOCATALYST)-BASED COATING LIQUID IS APPLIED TO URETHANE COATING FILM (COATING FILM THICKNESS : 5μ) | $2.0 \times 10^1$ | 4.0 |
| (NAFION + 6%Cu CARRYING S-DOPED PHOTOCATALYST)-BASED COATING LIQUID IS APPLIED TO PAPER PRODUCT (CORRESPONDING TO COATING FILM THICKNESS : 5μ) | $1.0 \times 10^1$ | 4.3 |
| (NAFION + 6%Cu CARRYING S-DOPED PHOTOCATALYST)-BASED COATING LIQUID IS APPLIED TO TEXTILE PRODUCT (CORRESPONDING TO COATING FILM THICKNESS : 5μ) | $2.8 \times 10^2$ | 2.9 |

NUMBER OF VIABLE BACTERIA UNDER TEST ILLUMINANCE=200LUX

LIGHT IRRADIATION CONDITION

| COATING CONDITION | $C_{200}$ | $R_{200}$ |
|---|---|---|
| (NAFION + 6%Cu CARRYING S-DOPED PHOTOCATALYST)-BASED COATING LIQUID IS APPLIED TO URETHANE COATING FILM (COATING FILM THICKNESS : 1μ) | $2.5 \times 10^1$ | 4.2 |
| (NAFION + 6%Cu CARRYING S-DOPED PHOTOCATALYST)-BASED COATING LIQUID IS APPLIED TO URETHANE COATING FILM (COATING FILM THICKNESS : 5μ) | $1.0 \times 10^1$ | 4.6 |
| (NAFION + 6%Cu CARRYING S-DOPED PHOTOCATALYST)-BASED COATING LIQUID IS APPLIED TO PAPER PRODUCT (CORRESPONDING TO COATING FILM THICKNESS : 5μ) | $1.0 \times 10^1$ | 4.6 |
| (NAFION + 6%Cu CARRYING S-DOPED PHOTOCATALYST)-BASED COATING LIQUID IS APPLIED TO TEXTILE PRODUCT (CORRESPONDING TO COATING FILM THICKNESS : 5μ) | $4.0 \times 10^2$ | 3.0 |

DARK IRRADIATION CONDITION

| COATING CONDITION | $C'_{200}$ | $R'_{200}$ |
|---|---|---|
| (NAFION + 6%Cu CARRYING S-DOPED PHOTOCATALYST)-BASED COATING LIQUID IS APPLIED TO URETHANE COATING FILM (COATING FILM THICKNESS : 1μ) | $4.6 \times 10^4$ | 1.6 |
| (NAFION + 6%Cu CARRYING S-DOPED PHOTOCATALYST)-BASED COATING LIQUID IS APPLIED TO URETHANE COATING FILM (COATING FILM THICKNESS : 5μ) | $3.7 \times 10^2$ | 3.7 |
| (NAFION + 6%Cu CARRYING S-DOPED PHOTOCATALYST)-BASED COATING LIQUID IS APPLIED TO PAPER PRODUCT (CORRESPONDING TO COATING FILM THICKNESS : 5μ) | $1.0 \times 10^1$ | 5.2 |
| (NAFION + 6%Cu CARRYING S-DOPED PHOTOCATALYST)-BASED COATING LIQUID IS APPLIED TO TEXTILE PRODUCT (CORRESPONDING TO COATING FILM THICKNESS : 5μ) | $3.7 \times 10^2$ | 3.7 |

Fig. 11

NUMBER OF VIABLE BACTERIA UNDER TEST ILLUMINANCE=900LUX

LIGHT IRRADIATION CONDITION

| COATING CONDITION | $C_{900}$ | $R_{900}$ |
|---|---|---|
| (NAFION + 6%Cu CARRYING S-DOPED PHOTOCATALYST)-BASED COATING LIQUID IS APPLIED TO WOODY BUILDING MATERIAL (COATING FILM THICKNESS : 1μ) | $6.8 \times 10^3$ | 1.6 |
| (NAFION + 6%Cu CARRYING S-DOPED PHOTOCATALYST)-BASED COATING LIQUID IS APPLIED TO WOODY BUILDING MATERIAL (COATING FILM THICKNESS : 5μ) | $2.5 \times 10^2$ | 3.0 |

DARK IRRADIATION CONDITION

| COATING CONDITION | $C'_{900}$ | $R'_{900}$ |
|---|---|---|
| (NAFION + 6%Cu CARRYING S-DOPED PHOTOCATALYST)-BASED COATING LIQUID IS APPLIED TO WOODY BUILDING MATERIAL (COATING FILM THICKNESS : 1μ) | $2.7 \times 10^4$ | 1.2 |
| (NAFION + 6%Cu CARRYING S-DOPED PHOTOCATALYST)-BASED COATING LIQUID IS APPLIED TO WOODY BUILDING MATERIAL (COATING FILM THICKNESS : 5μ) | $3.3 \times 10^4$ | 1.1 |

Fig. 12

WEIGHT REDUCTION RATE

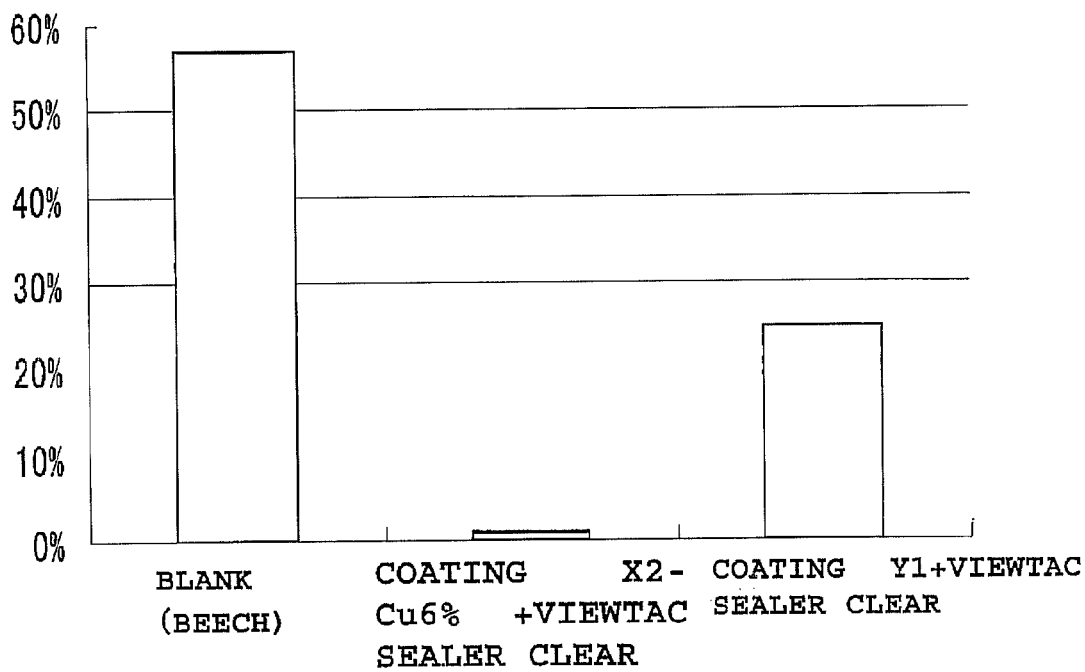

| KIND | DEGREE OF DECAY |
|---|---|
| BLANK | +++ |
| COATING X2-Cu6%+VIEWTAC SEALER CLEAR | − |
| COATING Y1+VIEWTAC SEALER CLEAR | ++ |

REMARKS
- − NO SIGN OF DECAY
- ± 
- + SLIGHT SIGN OF DECAY
- ++ SIGN OF DECAY OBSERVED
- +++ CONSIDERABLE DEGREE OF DECAY OBSERVED

| No | KIND \ TEST ITEM | SWOM TEST TIME | | | | | | | | |
|---|---|---|---|---|---|---|---|---|---|---|
| | | 800hrs | | | | | 1500hrs | | | |
| | | BLANK | TEST PRODUCT | RATE | ΔE | DEGREE OF DETERIORATION | BLANK | TEST PRODUCT | RATE | ΔE | DEGREE OF DETERIORATION |
| h | COATING X2-Cu6% + VIEWTAC SEALER CLEAR | 15.6 | 15.0 | 1.0 | 13.5 | −1 | 15.6 | 14.1 | 0.9 | 7.2 | −1 |

PHOTOCATALYTIC COATING, PHOTOCATALYTIC COATING FILM AND LAMINATED COATING FILM STRUCTURE

CROSS REFERENCE TO RELATED APPLICATIONS

This application claims priority from International Patent Application (PCT) Serial No. PCT/JP2010/056547, filed Apr. 12, 2010, and International Patent Application (PCT) Serial No. PCT/JP2011/052217, filed Feb. 3, 2011, the entire contents of each of which is herein incorporated fully by reference.

FIGURE FOR PUBLICATION

To Be Determined.

BACKGROUND OF THE INVENTION

1. Field of the Invention

The present invention relates to a photocatalytic coating, a photocatalytic coating film, and the laminated coating film structure. More specifically, the present invention relates to a photocatalytic body having a photocatalytic function and dispersed in a coating. The coating thus contains a photocatalyst, and can be applied to a surface layer of walls and tiles of a building so as to impart a photocatalytic function thereto.

2. Description of the Related Art

Conventionally, there has been studied and developed a technique in which a photocatalytic body having a photocatalytic function is dispersed in a coating thus preparing coating containing a photocatalyst, and the coating is applied to a surface layer of walls and tiles of a building thus imparting a photocatalytic function to the walls and tiles.

The walls and tiles which are imparted with a photocatalytic function in this manner can acquire advantageous effects such as sterilization, deodorization and purification attributed to an organic matter decomposition function by an oxidation reduction action of a photocatalytic body, and also a super hydrophilicity effect which increased affinity of walls or tiles with water (see patent JP-A-2001-64583 (document 1), for example).

However, the above-mentioned photocatalytic coating has a drawback that the coating per se is eroded when the photocatalyst is excited.

Further, when the photocatalytic coating is applied to the wall surfaces or tiles expecting an antibacterial effect and an antifungal effect (hereinafter simply also referred to as "antibacterial effect"), moisture is adsorbed in a coating surface due to a super hydrophilicity effect of the photocatalyst thus giving rise to a drawback that the growth of bacteria or mold is promoted.

ASPECTS AND SUMMARY OF THE INVENTION

The present invention has been made under such circumstances, and it is an object of the present invention to provide a photocatalytic coating, a photocatalytic coating film and the laminated coating film structure where the coating per se is hardly eroded even when a photocatalyst is excited and a coating surface having strong hydrophobic tendency can be formed. It is another object of the present invention to provide an industrial product to which the photocatalytic coating is applied by coating.

To overcome the above-mentioned conventional drawbacks, according to a first aspect of the present invention, there is provided a photocatalytic coating which is prepared by dispersing or dissolving at least a photocatalyst, a tetrafluoro-ethylene-based resin obtained by graft polymerization of a sulfonic acid, a compound containing metal ion having an ionic radius not less than an ionic radius of calcium and/or complex ion having an ionic radius not less than the ionic radius of calcium into a solvent.

In the above-mentioned photocatalytic coating, the compound containing metal ion may preferably be hydroxide.

In the above-mentioned photocatalytic coating, an electrically neutral surfactant may preferably be added to the photocatalytic coating.

In the above-mentioned photocatalytic coating, the hydroxide containing metal ion may preferably be calcium hydroxide, barium hydroxide, potassium hydroxide or mixture of these hydroxides.

In the above-mentioned photocatalytic coating, the complex ion may preferably be at least one selected from a group consisting of tetraammine copper ion, hexacyanoferrate ion and an aluminic acid.

In the above-mentioned photocatalytic coating, the photocatalyst may preferably be a copper-carrying visible-light responsive photocatalyst.

In the above-mentioned photocatalytic coating, a content rate of copper in the photocatalytic coating may preferably be set to 6 weight % or more.

In the above-mentioned photocatalytic coating, a hydrophobic resin may preferably be added to the photocatalytic coating.

In the above-mentioned photocatalytic coating, an adsorbent having porosity may preferably be added to the photocatalytic coating.

According to another aspect of the present invention, there is provided a photocatalytic coating film which is formed of any one of the above-mentioned photocatalytic coatings.

According to still another aspect of the present invention, there is provided the laminated coating film structure which includes: an antimicrobial coating film formed of an antimicrobial coating containing an antimicrobial component; and a photocatalytic coating film which is formed on a surface of the antimicrobial coating film using any one of the above-mentioned photocatalytic coating.

In the above-mentioned laminated coating film structure, the antimicrobial component may preferably be at least one selected from a group consisting of a dimethyl phenylsulfamide-based antimicrobial agent, a benzimidazole-based antimicrobial agent, a trihalomethylthio compound-based antimicrobial agent and a silver zeolite-based antimicrobial agent.

In the above-mentioned laminated coating film structure, an adsorbent to having porosity may preferably be added to the antimicrobial coating.

According to a further aspect of the present invention, there is provided a textile product to which any one of the above-mentioned photocatalytic coatings is applied by coating.

According to a still further aspect of the present invention, there is provided a building material to which the photocatalytic coating according to any one of the above-mentioned photocatalytic coatings is applied by coating.

According to a still further aspect of the present invention, there is provided an in-mold injection molded product to which the photocatalytic coating according to any one of the above-mentioned photocatalytic coatings is applied by coating.

According to the above-mentioned photocatalytic coating of the present invention, the photocatalytic coating is prepared by dispersing or dissolving at least a photocatalyst, a tetrafluoro-ethylene-based resin obtained by graft polymerization of a sulfonic acid, a compound containing metal ion having an ionic radius not less than an ionic radius of calcium and/or complex ion having an ionic radius not less than the ionic radius of calcium into a solvent. Accordingly, it is possible to provide a photocatalytic coating where the coating per se is hardly eroded even when a photocatalyst is excited and a coating surface having strong hydrophobic tendency can be formed.

According to the above-mentioned photocatalytic coating of the present invention, the compound containing metal ion is hydroxide and hence, it is possible to prepare, efficiently and at a low cost, a photocatalytic coating where the coating per se is hardly eroded even when a photocatalyst is excited and a coating surface having strong hydrophobic tendency can be formed.

According to the above-mentioned photocatalytic coating of the present invention, an electrically neutral surfactant is added to the photocatalytic coating and hence, it is possible to provide a photocatalytic coating with improved coating property.

According to the above-mentioned photocatalytic coating of the present invention, the hydroxide containing metal ion is calcium hydroxide, barium hydroxide, potassium hydroxide or mixture of these hydroxides. Accordingly, it is possible to provide a photocatalytic coating where a coating surface having stronger hydrophobic tendency can be formed.

According to the above-mentioned photocatalytic coating of the present invention, the complex ion is at least one selected from a group consisting of tetraammine copper ion, hexacyanoferrate ion and an aluminic acid. Accordingly, it is possible to provide a photocatalytic coating where a coating surface having strong hydrophobic tendency can be formed. Further, when tetraammine copper ion is used as the complex ion, it is possible to provide a photocatalytic coating which can effectively exhibit antimicrobial property attributed to copper.

According to the above-mentioned photocatalytic coating of the present invention, the photocatalyst is a copper-carrying visible-light responsive photocatalyst and hence, it is possible to provide a photocatalytic coating which can exhibit antimicrobial property attributed to copper and can acquire a photocatalytic effect by being exposed to an illumination light even in the room.

According to the above-mentioned photocatalytic coating of the present invention, a content rate of copper in the photocatalytic coating is set to 6 weight % or more and hence, it is possible to provide a photocatalytic coating which can effectively exhibit antimicrobial property even under a condition where a quantity of light is extremely small.

According to the above-mentioned photocatalytic coating of the present invention, a hydrophobic resin is added to the photocatalytic coating and hence, it is possible to provide a photocatalytic coating where the coating per se is hardly eroded even when a photocatalyst is excited and a coating surface having strong hydrophobic tendency can be formed, and a cost per unit amount is low.

According to the above-mentioned photocatalytic coating of the present invention, an adsorbent having porosity is added to the photocatalytic coating and hence, harmful substances and the like present in air can be adsorbed in a coating surface whereby efficiency of decomposition caused by a photocatalytic effect can be enhanced.

According to the above-mentioned photocatalytic coating film of the present invention, the photocatalytic coating film is formed of the photocatalytic coating. Accordingly, it is possible to provide the photocatalytic coating film where the coating per se is hardly eroded even when a photocatalyst is excited and the coating film is provided with a coating surface which exhibits strong hydrophobic tendency.

According to the above-mentioned laminated coating film structure of the present invention, the laminated coating film structure includes: an antimicrobial coating film formed of an antimicrobial coating containing an antimicrobial component; and a photocatalytic coating film which is formed on a surface of the antimicrobial coating film using the photocatalytic coating. Accordingly, it is possible to provide the laminated coating film structure where the coating per se is hardly eroded even when a photocatalyst is excited, the coating film is provided with a coating surface which exhibits strong hydrophobic tendency, and can exhibit a sufficient antibacterial effect even when the number of viable bacteria is large.

According to the above-mentioned laminated coating film structure of the present invention, the antimicrobial component is at least one selected from a group consisting of a dimethyl phenylsulfamide-based antimicrobial agent, a benzimidazole-based antimicrobial agent, a trihalomethylthio compound-based antimicrobial agent and a silver zeolite-based antimicrobial agent. Accordingly, the laminated coating film structure can exhibit a sufficient antimicrobial effect attributed to the antimicrobial component by allowing bacterial to pass through the photocatalytic coating film.

According to the above-mentioned laminated coating film structure of the present invention, an adsorbent having porosity is added to the antimicrobial coating and hence, harmful substances and the like present in air can be adsorbed in a coating surface whereby efficiency of decomposition caused by a photocatalytic effect can be enhanced.

According to the above-mentioned textile product of the present invention, the photocatalytic coating is applied to a textile product by coating and hence, the textile product can easily carry a photocatalyst, and it is possible to prevent the erosion of the textile product even when the photocatalyst is excited.

According to the above-mentioned building material of the present invention, the photocatalytic coating is applied to a building material by coating and hence, the building material can easily carry a photocatalyst, and it is possible to prevent the erosion of the building material even when the photocatalyst is excited.

According to the above-mentioned in-mold injection molded product of the present invention, the photocatalytic coating is applied to an in-mold injection molded product by coating and hence, it is possible to provide a molded product coated with a photocatalytic coating simultaneously with molding.

The above, and other aspects, features and advantages of the present invention will become apparent from the following description read in conjunction with the accompanying drawings, in which like reference numerals designate the same elements.

BRIEF DESCRIPTION OF THE DRAWINGS

FIG. 2 is an explanatory view showing a result of an antimicrobial property test of a photocatalytic coating of this embodiment.

FIG. 3 is an explanatory view showing a result of an antimicrobial property test of a photocatalytic coating of this embodiment.

FIG. 8 is an explanatory view showing a wall surface P to which respective photocatalytic coatings A to E are applied.

FIG. 10 is an explanatory view showing a result of an antimicrobial property test of a textile product.

FIG. 11 is an explanatory view showing a result of an antimicrobial property test.

FIG. 12 is an explanatory view showing a result of a test carried out with respect to a wooden building material.

DETAILED DESCRIPTION OF THE PREFERRED EMBODIMENTS

Figure 1A:
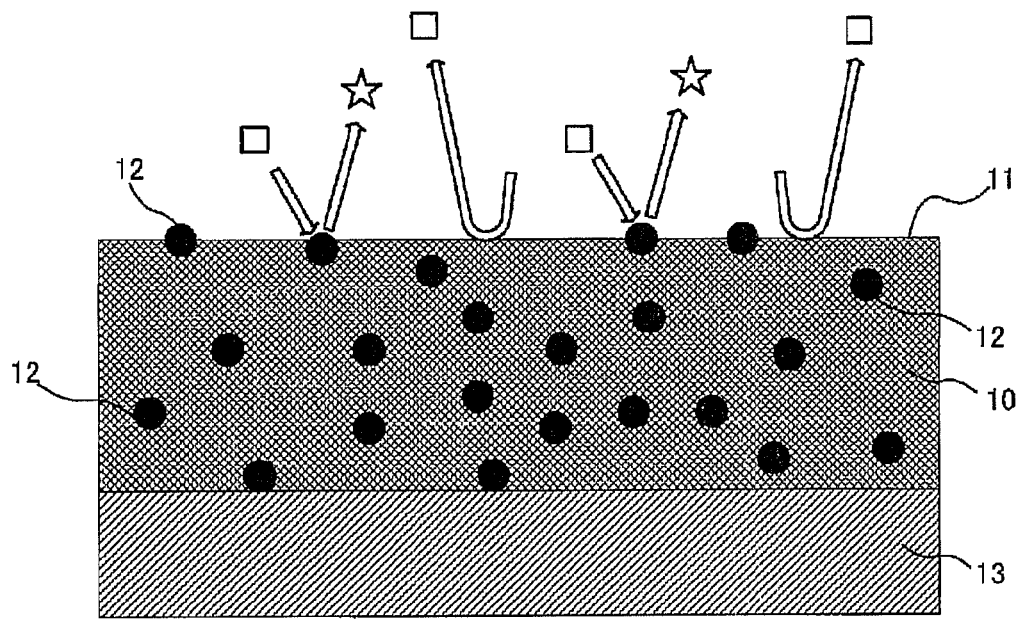
FIG. 1A is an explanatory view showing the coating film structure using a conventional photocatalytic coating.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The present invention provides a photocatalytic coating prepared by dispersing or dissolving a photocatalyst, a tetrafluoro-ethylene-based resin obtained by graft polymerization of a sulfonic acid, a metal hydroxide having an ionic radius larger than an ionic radius of calcium and/or complex ion having an ionic radius larger than the ionic radius of calcium into a solvent.

By applying a photocatalytic coating to an arbitrary object to which the coating is applied (hereinafter referred to as "coating object"), a surface of the coating film is formed on the coating object thus giving photocatalytic effect as well as water repellency to the coating object.

As outstanding advantageous effects of the photocatalytic coating of this embodiment, the following advantageous effects can be named.

(1) Propagation of microorganism such as bacteria or mold can be effectively suppressed.

(2) An area where the photocatalyst can perform a photocatalytic action can be drastically enlarged.

(3) Harmful substances floating in air can be efficiently decomposed.

(4) Dirt adhered to the coating object can be easily removed.

Firstly, to facilitate the understanding of the photocatalytic coating of this embodiment, the above-mentioned advantageous effects (1) to (4) are explained in order in conjunction with the summary of the invention.

(1) Propagation of microorganism such as bacteria or mold can be effectively suppressed.

The photocatalytic coating of this embodiment is a photocatalytic coating which uses tetrafluoro-ethylene-based resin obtained by graft polymerization of a sulfonic acid as a binder. This tetrafluoro-ethylene-based resin obtained by graft polymerization of a sulfonic acid is a resin generally known as "Nafion®". In this specification, the resin is also simply referred to as "Nafion" hereinafter.

Nafion is hardly eroded even when a photocatalyst is excited and can effectively prevent a coating film from being deteriorated. However, Nafion is a resin which is classified as a hydrophilic resin in the field of coating and hence, the surface of the coating film of Nafion generally exhibits the hydrophilicity. Accordingly, in the photocatalytic coating which is prepared by merely using Nafion as a binder and by dispersing a photocatalyst in the coating, the formed coating film adsorbs moisture and hence, there is a case where propagation of bacteria or mold is promoted. This phenomenon is particularly remarkable when the coating film is formed by applying the coating in a building.

Further, nutrients necessary for the growth of microorganism are dissolved in moisture in many cases and hence, in a building where the photocatalyst is hardly excited, there has been a case where the moisture, the nutrients and air cooperatively create a favorable condition for the growth of microorganism.

In view of the above, the photocatalytic coating of this embodiment contains a compound containing metal ion having an ionic radius not less than an ionic radius of calcium and/or complex ion having an ionic radius not less than the ionic radius of calcium.

The compound containing metal ion having the ionic radius not less than the ionic radius of calcium or complex ion having the ionic radius not less than the ionic radius of calcium has a function of weakening hydrophilicity of Nafion through a neutralization reaction with a functional group which imparts hydrophilicity to Nafion, that is, an acid sulfo group (—SO$_3$H). In the following explanation, both of the compound which contains metal ion having the ionic radius not less than the ionic radius of calcium and complex ion which has the ionic radius not less than the ionic radius of calcium may be collectively referred as "neutralizing agent".

Both of the neutralizing agents have ionic radius not less than the ionic radius of calcium. This finding is obtained as a result of the intensive studies which the inventors of the present invention have made. Although results of experiments on this finding are explained later, by setting the ionic radius of the metal not less than the ionic radius of calcium when the compound containing metal ion is used as a neutralizing agent, and by setting the ionic radius of complex ion not less than the ionic radius of calcium when the complex ion is used as a neutralizing agent, a surface of the coating film exhibits stronger hydrophobicity. In the explanation made hereinafter, metal ion and complex ion when a metal hydroxide is used as the neutralizing agent may be also referred to as "neutralizing agent ion" collectively.

It is thought that this phenomenon occurs due to the following reason. That is, when a radius of the neutralizing agent ion which is bonded to a sulfo group of Nafion becomes equal to or more than the ionic radius of calcium, neutralizing agent ions connected to Nafion influence each other so that a meandering linear-chain Nafion molecule extends linearly whereby fluorine in the molecular structure is directed to the outside.

Due to such a phenomenon, the hydrophilicity of Nafion is decreased or lost so that the coating film exhibits the hydrophobicity.

Accordingly, a surface of the coating film which is formed of the photocatalytic coating of this embodiment does not adsorb moisture necessary for the propagation of microorganism and hence, the surface of the coating film can effectively suppress the propagation of microorganism. This advantageous effect is particularly useful in the room where sunbeam hardly reaches.

(2) An area where the photocatalyst can perform the photocatalytic action can be drastically enlarged.

Generally, a coating film which is formed by applying coating to a coating object has the network-like structure where resin molecules which constitute a binder are entangled with each other in a complicated manner.

FIG. 1A is a schematic view showing the cross-sectional structure of the coating film 10 which is formed of a conventional photocatalytic coating. In the drawing, although the coarseness depicted by half-tone dot meshing in the coating film 10 indicates a size of the above-mentioned network, for facilitating the understanding of the structure, a size of the network is not always accurate. Symbol 13 indicates the coating object.

As can be understood from FIG. 1A, the coating film 10 which is formed of the conventional photocatalytic coating is formed in such a manner that the binders are entangled with each other extremely densely so that the network of the binder is in a dense state.

Accordingly, there exists no possibility that organic matters (indicated by a quadrangle) enters the inside of the coating film 10 and hence, a reaction attributed to the photocatalyst 12 is induced only by the photocatalyst 12 which is exposed on a surface 11 whereby the coating film 10 possesses low photocatalytic function. In the drawing, pentagram indicates generated products which are generated by the decomposition of organic matters (hereinafter, also referred to as decomposed products). A coating film which is constituted of a silicate-group binder having resistance against the deterioration caused by the photocatalyst 12 also has the substantially same structure.

Figure 1B:
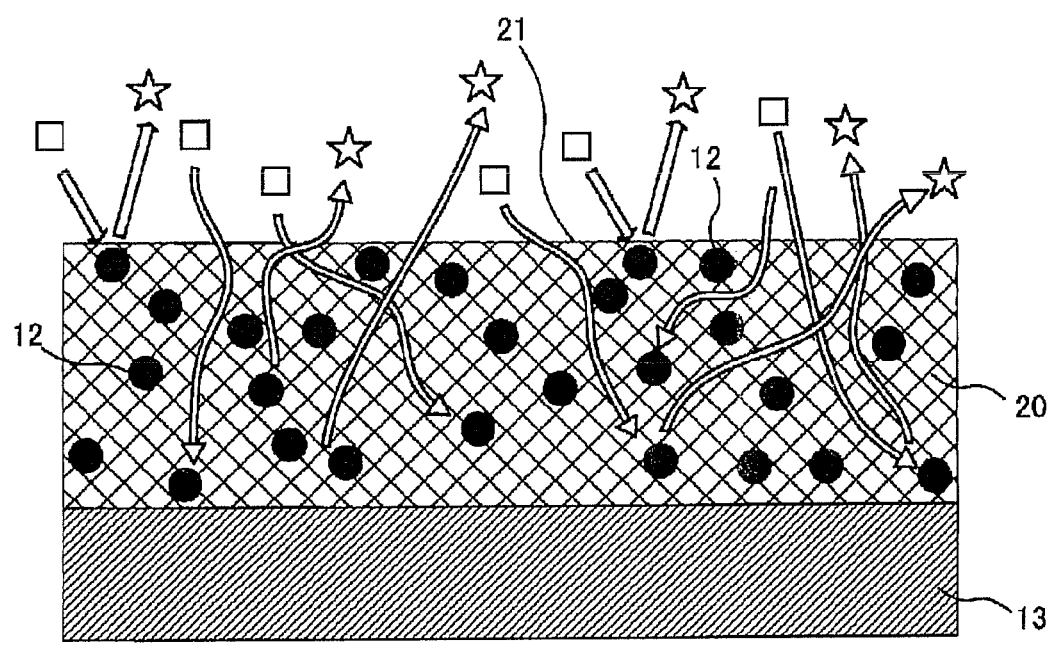
FIG. 1B is an explanatory view showing the coating film structure of a photocatalytic coating according to an embodiment of the present invention.

To the contrary, as shown in FIG. 1B, in a photocatalytic coating film 20 which is formed of a photocatalytic coating of this embodiment, as described above, Nafion which constitutes a binder extends linearly thus forming the coarse network structure and hence, particularly, gaseous organic matters are permeable to the inside of the photocatalytic coating film 20.

Further, when the photocatalytic coating film 20 is formed of a thin film, the photocatalytic coating film 20 allows a light to pass therethrough and hence, the photocatalyst embedded in the inside of the photocatalytic coating film 20 can be excited.

Accordingly, not to mention that the photocatalytic reaction can be generated by the photocatalyst 12 exposed on the surface 21, the photocatalytic reaction can be also generated by the photocatalyst embedded in the inside of the photocatalytic coating film 20. As described above, the coating film which is formed of the photocatalytic coating of this embodiment can drastically increase the area in which the photocatalyst can perform the photocatalytic action.

(3) Harmful substances floating in air can be efficiently decomposed.

As described above, the photocatalytic coating film 20 which is formed of the photocatalytic coating of this embodiment shown in FIG. 1B has the coarse network structure compared to the conventional coating film 10 shown in FIG. 1A.

In the coating film 10 which is formed of the conventional photocatalytic coating, as shown in FIG. 1A, for example, the organic matters (indicated by a quadrangle) such as gaseous harmful substances cannot enter the inside of the coating film 10. Accordingly, although the organic matters approach the surface 11, the organic matters are separated from the surface 11 again.

Accordingly, the reaction which can be generated by the photocatalyst 12 is generated only by the photocatalyst 12 exposed on the surface 11 and hence, the generation quantity of decomposed product (pentagrams) is extremely small.

To the contrary, with respect to the photocatalytic coating film 20 which is formed of the photocatalytic coating of this embodiment, not to mention that the organic matters can be decomposed by generating photocatalytic reaction using the photocatalyst 12 present in the vicinity of the surface 21, as described above, Nafion which constitutes the binder extends linearly and forms the coarse network structure and hence, particularly, a gaseous organic matters permeate the photocatalytic coating film 20 and reach the inside of the photocatalytic coating film 20 (see FIG. 1B).

Accordingly, the organic matter can be decomposed by the photocatalytic reaction using the photocatalyst present in the inside of the photocatalytic coating film 20, and also the decomposed product can be discharged to the outside the photocatalytic coating film 20 again and hence, harmful substances can be efficiently decomposed.

Particularly, in recent years, a sick house syndrome which is induced by acetaldehyde present in the room has been a matter of concern. The photocatalytic coating film 20 which is formed of the photocatalytic coating of this embodiment is extremely effective against such gaseous harmful substances. In other words, not to mention that the photocatalytic coating film 20 which is formed of the photocatalytic coating of this embodiment is effectively used outdoors, the photocatalytic coating film 20 which is formed of the photocatalytic coating of this embodiment exhibits further usefulness in the indoor use.

In the same manner, with respect to the photocatalytic coating film 20 which is formed of the photocatalytic coating of this embodiment, although a result of the test is explained later, the laminated coating film structure where an antimicrobial coating film containing antimicrobial component constitutes a lower layer and the photocatalytic coating film 20 constitutes an upper layer allows the antimicrobial component contained in the antimicrobial coating film to easily permeate therethrough, to be exposed on the surface of the photocatalytic coating film 20 and to be dispersed from the surface of the photocatalytic coating film 20.

(4) Dirt adhered to the coating object can be easily removed.

The surface 21 of the photocatalytic coating film 20 which is formed of the photocatalytic coating of this embodiment exhibits hydrophobicity. Accordingly, the photocatalytic coating film 20 hardly adsorbs dirt which exhibit affinity with moisture and, further, even when the dirt is adhered to the photocatalytic coating film 20, the dirt can be easily removed.

From the above, it is understood that not to mention that dirt is hardly adhered to the surface 21 in appearance or dirt is easily removed from the surface 21, the photocatalytic coating film 20 also has the close relationship with the suppression of propagation of microorganisms from a viewpoint of stopping the supply of nutrition which microorganism requires for propagation and from a viewpoint of easily removing microorganism. That is, the photocatalytic coating film 20 which is formed of the photocatalytic coating of this embodiment can suppress the propagation of microorganism also by decreasing the supply of nutrition which microorganism requires for propagation.

The photocatalytic coating of this embodiment can form the photocatalytic coating film 20 which can acquire the above-mentioned advantageous effects.

The above-mentioned advantageous effects are brought about by preparing the photocatalytic coating of this embodiment in such a manner that a photocatalyst, a tetrafluoro-ethylene-based resin obtained by graft polymerization of a sulfonic acid, a compound containing metal ion having an ionic radius not less than an ionic radius of calcium and/or complex ion having an ionic radius not less than the ionic radius of calcium are dispersed or dissolved into a solvent.

Here, the photocatalyst is not particularly limited provided that the photocatalyst is formed of a metal-oxide-based substance and is formed of pigment component which decomposes water or generates peroxide by being excited by light such as ultraviolet rays or a visible light. For example, metal which is a semiconductor such as titania, iron oxide, copper oxide, tungsten oxide, lithium titanate or strontium titanate can be used as a material for forming the photocatalyst. Further, side chains of these metal oxides and the like may be suitably modified corresponding to respective characteristics.

Further, the photocatalyst may preferably be a visible-light responsive photocatalyst. For example, when the photocatalytic coating according to the present invention is used as a bacteria-prevention coating or a mold prevention coating indoors, even when there is no sun beams, it is possible to excite the photocatalyst in the coating using the indoor illumination or the like.

As such a visible-light responsive photocatalyst, for example, sulfur-doped titanium oxide, titanium oxide where a portion of a surface thereof is modified with Pt, or nitrogen-doped titanium oxide may preferably be used. However, the visible-light responsive photocatalyst may not always be limited to such components. That is, it is sufficient for the photocatalyst that the photocatalyst can be excited by a visible light irradiated from a lighting apparatus or the like used for indoor illumination.

An amount of photocatalyst is set such that the photocatalytic coating contains, after being prepared, 0.1 weight % to 50.0 weight % of photocatalyst, and more preferably, 0.5 weight % to 10.0 weight % of photocatalyst. With such a mixing rate, the photocatalytic coating can acquire sufficient photocatalytic effects.

Further, an amount of tetrafluoro-ethylene-based resin obtained by graft polymerization of a sulfonic acid is set such that the photocatalytic coating contains, after being prepared, 0.5 volume % to 90.0 volume % of tetrafluoro-ethylene-based resin, and more preferably, 2.0 volume % to 60.0 volume % of tetrafluoro-ethylene-based resin.

Further, the compound which includes metal ion having an ionic radius not less than an ionic radius of calcium is not particularly limited provided that the compound satisfies such a condition. That is, as the compound which contains metal ion, hydroxide, a compound which uses inorganic anions as counter-ion, hydride, nitride, oxide or the like can be named. Among these materials, the compound may preferably be hydroxide. As a specific example of hydroxide, calcium hydroxide, barium hydroxide, potassium hydroxide or the mixture of these compounds can be used. By using hydroxide as the compound which contains metal ion having an ionic radius not less than the ionic radius of calcium, compared to a compound which exhibits weak alkaline property when the compound is hydrated, the neutralization can be performed efficiently and hence, an amount of neutralizing agent to be used can be reduced.

With respect to the compound which contains metal ion having an ionic radius not less than the ionic radius of calcium, the photocatalytic coating contains, after being prepared, 0.01 weight % to 10.0 weight % of compound, preferably, 0.1 weight % to 2.0 weight % of compound. With such a mixing rate, the photocatalytic coating can acquire the sufficient water repellency.

Further, the complex ion having an ionic radius not less than an ionic radius of calcium may be, for example, tetraammine copper ion, hexacyanoferrate ion, an aluminic acid or mixture of these ions. Particularly, when tetraammine copper ion is used as the complex ion, it is possible to impart an antimicrobial effect, an antifungal effect and an antiviral effect to the formed coating film. These effects are explained later in conjunction with test data.

An amount of complex ion having an ionic radius not less than an ionic radius of calcium is set to 0.01 volume % to 10.0 volume %, and more preferably to 0.2 volume % to 5.0 volume % with respect to a volume of added tetrafluoro-ethylene-based resin obtained by graft polymerization of a sulfonic acid. With such a mixing rate, the photocatalytic coating can acquire a sufficient water repellency effect.

In addition to the above-mentioned structure, the photocatalyst may be a visible-light responsive photocatalyst which carries copper thereon. Due to such structure, a sterilizing effect attributed to copper can be further enhanced. Further, the photocatalyst can acquire a photocatalytic effect more effectively even with an indoor illumination light which contains a small amount of ultraviolet rays.

Further, it is more preferable that the photocatalytic coating contains not less than 6 weight % of copper contained in the above-mentioned complex ion or 6 weight % of copper contained in the photocatalyst. By setting a content of copper to not less than 6 weight %, it is possible to remarkably enhance a sterilizing effect attributed to copper. Accordingly, even under a condition where light does not impinge on a coating surface (hereinafter also referred to as "under dark condition"), the photocatalytic coating can acquire a sterilizing effect.

It is preferable to use an alcohol-based solvent as the solvent. As the preferable alcohol-based solvent, for example, isopropyl alcohol, n-propyl alcohol, ethyl alcohol, methyl alcohol and butyl alcohol may be named.

With respect to an amount of such a solvent, the photocatalytic coating contains, after being prepared, 5.0 volume % to 80.0 volume % of solvent, and more preferably 20.0 volume % to 60.0 volume % of solvent. With such a mixing rate, respective solutes can be sufficiently dispersed or dissolved.

Further, an electrically neutral surfactant may be added to the photocatalytic coating. The photocatalytic coating according to the present invention can further enhance coating property with the addition of the surfactant. As the electrically neutral surfactant, for example, diethyl polysiloxane, dimethyl polysiloxane and polymethyl siloxane can be preferably used.

With respect to an amount of such a surfactant, the photocatalytic coating contain, after being prepared, 0.002 volume % to 5.0 volume % of surfactant, and more preferably 0.01 volume % to 0.5 volume % of surfactant. With such a mixing rate, the coating property of the photocatalytic coating according to the present invention can be further enhanced.

A hydrophobic resin may be further added to the photocatalytic coating. By adding an approximately 2 to 40 weight % of hydrophobic resin with respect to a total amount of photocatalytic coating according to the present invention, even when the photocatalyst is excited, the coating per se is hardly eroded, and a coating surface which exhibits strong hydrophobic tendency can be formed and, further, a cost of the photocatalytic coating per unit amount can be lowered.

Further, an adsorbent having porosity may be added to the photocatalytic coating. By adding the adsorbent having porosity, harmful substances and the like existing in atmosphere are adsorbed into the coating surface thus enhancing the efficiency of decomposition caused by the photocatalytic effect.

To explain further, the general-purpose-use photocatalytic coating has a drawback that, when the photocatalytic coating does not use a binder having resistance against the organic matter decomposition ability of the photocatalyst, the adsorbent is eroded by the organic matter decomposition ability of the photocatalyst so that an effect of the adsorbent is rapidly lost.

Further, even in a case where a binder having resistance against the organic matter decomposition ability of the photocatalyst is used, for example, when the binder is the binder whose mesh is too fine such as the above-mentioned silicate-based binder, there exists a drawback that harmful substances cannot be efficiently decomposed.

In the photocatalytic coating of this embodiment, the tetrafluoro-ethylene-based resin which is obtained by graft polymerization of a sulfonic acid, has resistance against the organic matter decomposition ability of the photocatalyst and can form a relatively coarse mesh is used as a binder. Accordingly, even when the photocatalyst is excited, the adsorbent can be stably held in the coating film and, further, a harmful substance adsorption effect brought about by the adsorbent can be acquired at maximum. That is, the binder protects the adsorbent from the organic matter decomposition ability of the photocatalyst. Further, the photocatalytic coating of this embodiment has hydrophobicity and hence, even when the adsorbent is an adsorbent which has hydrophobic tendency, the adsorbent can be relatively easily dispersed in the coating.

As the adsorbent to be added to the photocatalytic coating, an inorganic adsorbent, a carbonaceous adsorbent, an organic adsorbent and the like can be named.

As the inorganic adsorbent, for example, silica gel, activated alumina, zeolite, aluminophosphate-type molecular sieve, meso-porous silica and the like can be preferably used.

Silica gel has hydrophilicity and hence, silica gel is preferably used for the adsorption of substances which have polarity such as moisture, alcohol and the like. Further, a surface of activated alumina has polarity stronger than polarity of silica gel, and has both characteristics of acidity and basicity. Further, activated alumina has excellent water resistance and heat resistance compared to silica gel and can adsorb various kinds of substances and hence, activated alumina has the broad applications. Further, zeolite is suitable for the adsorption of substances having a small molecular size and polarity such as ammonia and hydrogen sulfide.

As the carbonaceous adsorbent, for example, activated carbon and carbon molecular sieve can be named. Activated carbon is known as a hydrophobic adsorbent and is effective for the adsorption of hydrocarbon. For example, activated carbon is suitable for the adsorption of substances having a large molecular size such as methyl mercaptan or B. T. X, organic solvent and the like. Besides, activated carbon is useful for the adsorption of a halogen gas, hydrogen halogenide, a nitric acid, a chain hydrocarbon group, a cyclic hydrocarbon group, a halogenated hydrocarbon group, an alcohol group, an ether group, a ketone group, an ester group, aniline, carbon disulfide, a sulfurous acid gas, a hydrocyanic acid gas, hydrogen sulfide, methyl bromide, vinyl chloride, phosphine, ammonia and the like.

Carbon molecular sieve exhibits hydrophobicity and hence, carbon molecular sieve is suitable for the adsorption of hydrocarbon. Carbon molecular sieve is suitable for the adsorption of non-polar molecules rather than the adsorption of polar molecules.

As the organic adsorbent, for example, a plant adsorbent, a synthetic adsorbent, and a biomass adsorbent can be named. As the plant adsorbent, a component which is extracted from plant can be used. For example, a polyflapane derivative, a cedrene-based compound, a tannic acid, tannin, flavonoid, an abietic acid and the like can be used.

Further, as the adsorbent, an inorganic adsorbent, a carbonaceous adsorbent, an organic adsorbent may be used as a single form. However, by using a mixture adsorbent obtained by mixing these adsorbents, it is possible to form a coating film which can adsorb substances in a broader range.

Further, the photocatalytic coating which is prepared using the above-mentioned materials can, when a coating film formed of the photocatalytic coating is formed on a textile product, easily impart a photocatalytic function and an antimicrobial effect to the textile product while preventing the textile product from being eroded when the photocatalyst is excited. Here, as the textile product, for example, a fabric product such as clothing, bedding and towels, papers, non-woven fabrics and the like can be named.

Further, the photocatalytic coating which is prepared using the above-mentioned materials can, when the photocatalytic coating is applied to a textile product by coating, easily impart a photocatalytic function to the textile product while preventing the textile product from being eroded when the photocatalyst is excited.

In the same manner as the above-mentioned adsorbent, in the case of the general-purpose-use photocatalytic coating which has no resistance against an organic matter decomposition ability of a photocatalyst, when the photocatalyst is excited, a textile product is eroded by the organic matter decomposition ability which the photocatalyst possesses. However, in the photocatalytic coating of this embodiment, tetrafluoro-ethylene-based resin obtained by graft polymerization of a sulfonic acid is used as a binder and hence, it is possible to provide a textile product to which photocatalytic ability is imparted while preventing the photocatalyst from damaging the textile product. That is, the binder protects the textile product from the organic matter decomposition ability of the photocatalyst.

Further, the photocatalytic coating which is prepared by the above-mentioned materials can, when a coating film fanned of the photocatalytic coating is formed on a building material which constitutes a building by coating, easily impart a function of photocatalyst and an antimicrobial effect to the building material. Particularly, when the building material is wood (hereinafter, referred to as wooden building material) is used as the building material, by forming the coating film on the wooden building material, it is possible to easily impart a photocatalyst function and an antimicrobial effect to the wooden building material while preventing the wooden building material from being eroded when the photocatalyst is excited. Here, the wooden building material means a building material which is partially or wholly made of wood. To be more specific, a pillar, a wall material, a ceiling material, a roof material, and a finishing material can be named, for example.

Further, the photocatalytic coating may be applied to a textile product, a building material or the like aiming at only the formation of a single layer formed of a photocatalytic coating film. However, the photocatalytic coating may be applied aiming at the formation of the laminated coating film structure described later. That is, on a surface of the textile product or the building material, the laminated coating film structure where a photocatalytic coating film formed of the photocatalytic coating of this embodiment constitutes an upper layer and an antimicrobial coating film formed of the antimicrobial coating containing an antimicrobial agent which constitutes a lower layer may be formed.

[Preparation Method and Test of Photocatalytic Coating and Photocatalytic Coating Film]

Next, the photocatalytic coating and the photocatalytic coating film of this embodiment are further specifically explained together with the preparation method and test results of other samples as a control.

First of all, following 6 kinds of photocatalytic coatings are prepared so as to test properties of photocatalytic coatings of this embodiment.

[1-1-1. Preparation of Photocatalytic Coating X1 of this Embodiment]

Photocatalytic coating X1 (hereinafter, also referred to as "coating X1"):

0.3 L of Nafion DE2020 (made by E. I. du Pont de Nemours & Company) is dispensed in a stainless steel vessel having a capacity of 2 L, 60 g of sulfur-doped photocatalytic titanium oxide (product of Toho Titanium Co., Ltd) and 2 g of barium hydroxide and 0.3 g of diethyl polysiloxan are filled in the vessel, and further, 0.2 L of isopropanol is added as a solvent and 0.2 L of water is added. These components and pigment dispersing glass beads are mixed with each other and, thereafter, the mixture is stirred at a temperature of 20° C. for 120 minutes using a stirrer thus preparing the photocatalytic coating X1.

[1-1-2. Preparation of Photocatalytic Coating X4 of this Embodiment]

Photocatalytic coating X4 (hereinafter, also referred to as "coating X4"):

Although the photocatalytic coating X4 is prepared in the substantially same manner as the photocatalytic coating X1, in place of 2 g of barium hydroxide, 2 g of potassium hydroxide is added.

[1-1-3. Preparation of Photocatalytic Coating X5 of this Embodiment]

Photocatalytic coating X5 (hereinafter, also referred to as "coating X5"):

Although the photocatalytic coating X5 is prepared in the substantially same manner as the photocatalytic coating X1, in place of 2 g of barium hydroxide, 2 g of calcium hydroxide is added.

[1-1-4. Preparation of Photocatalytic Coating Y1 as a Control]

Photocatalytic coating Y1 as a control (hereinafter, also referred to as "coating Y1"):

0.3 L of Nafion DE2020 (made by E.I. du Pont de Nemours & Company) is dispensed in a stainless steel vessel having a capacity of 2 L, 60 g of sulfur-doped photocatalytic titanium oxide (product of Toho Titanium Co., Ltd) and 2 g of lithium hydroxide are filled in the vessel, and further, 0.2 L of isopropanol is added as a solvent and 0.2 L of water is added. These components and pigment dispersing glass beads are mixed with each other and, thereafter, the mixture is stirred at a temperature of 20° C. for 120 minutes using a stirrer thus preparing the coating Y1 as a control.

[1-1-5. Preparation of Photocatalytic Coating Y2 as a Control]

Photocatalytic coating Y2 as a control (hereinafter, also referred to as "coating Y2"):

0.3 L of silicate-based coating (MS-57 made by Mitsubishi Chemical Corporation) is dispensed in a stainless steel vessel having a capacity of 2 L, 60 g of sulfur-doped photocatalytic titanium oxide (product of Toho Titanium Co., Ltd) is filled in the vessel, and further, 0.2 L of isopropanol is added as a solvent and 0.2 L of water is added. These components and pigment dispersing glass beads are mixed with each other and, thereafter, the mixture is stirred at a temperature of 20° C. for 120 minutes using a stirrer thus preparing the coating Y2 as a control.

[14-6. Preparation of Photocatalytic Coating Y8 as a Control]

Photocatalytic coating Y8 as a control (hereinafter, also referred to as "coating Y8"):

Although photocatalytic coating Y8 is prepared in the same manner as the photocatalytic coating Y1, in place of 2 g of lithium hydroxide, 2 g of iron hydroxide is added.

[1-2. Water Repellency Effect Test of the Surface of the Coating Film]

Next, by using the prepared coatings X1, X4, X5, Y1, Y2, Y8, the photocatalytic effect test of the surface of the coating film is performed. The test is performed by spraying water on the coating films under a bright condition and by observing behavior of water. The coating films are formed by spraying respective coatings on a color steel plate which constitutes a coating object using a spray gun and by drying the coating. A film thickness of the coating film is 5.0 μm. The test result is shown in Table 1.

TABLE 1

| Item (specification) | Coating X4 | Coating X1 | Coating X5 |
|---|---|---|---|
| Photocatalyst 200 phr | S-doped photocatalyst | S-doped photocatalyst | S-doped photocatalyst |
| Binder | Nafion | Nafion | Nafion |
| Neutralization treatment | Potassium hydroxide | Barium hydroxide | Calcium hydroxide |
| Surfactant N.V. 3% | Present | Present | Present |
| Solvent | IPA | IPA | IPA |

TABLE 1-continued

|  |  |  |  |
|---|---|---|---|
| Water spray | water membrane shrunken | water membrane shrunken | water membrane shrunken |
| Hydrophilic or hydrophobic | Hydrophobic | Hydrophobic | Hydrophobic |
| Dynamic contact angle | 50° | 47° | 40° |
| Ionic radius | 1.37 | 1.35 | 1.00 |

|  | Coating Y8 | Coating Y1 | Coating Y2 |
|---|---|---|---|
| Photocatalyst 200 phr | S-doped photocatalyst | S-doped photocatalyst | S-doped photocatalyst |
| Binder | Nafion | Nafion |  |
| Neutralization treatment | Iron hydroxide | Lithium hydroxide | — |
| Surfactant N.V. 3% | Present | Not present | Not present |
| Solvent | IPA | IPA | IPA |
| Water spray | water membrane formed | water membrane formed | water membrane formed |
| Hydrophilic or hydrophobic | Hydrophilic | Hydrophilic | Hydrophilic |
| Dynamic contact angle | 30° | 28° | Not measurable |
| Ionic radius | 0.63 | 0.59 | — |

As also shown in Table 1, a water membrane is shrunken on the surface of the coating film formed of the coating X1, and outstanding hydrophobic tendency is confirmed. Here, a dynamic contact angle is 47°.

A water membrane is also shrunken on the surface of the coating film formed of the coating X2 in the same manner, and outstanding hydrophobic tendency is confirmed. Here, a dynamic contact angle is 50° which is larger than the dynamic contact angle of the coating X1.

Although water membrane is also shrunken on the coating surface of the coating X5, and hydrophobic tendency is observed, hydrophobic tendency of the coating X5 is slightly weaker than the coating X1. Here, a dynamic contact angle is 40°.

On the other hand, with respect to the coating Y1 which is a coating used as a control, although a neutralizing agent is contained in the coating Y1, lithium hydroxide having an ionic radius not larger than an ionic radius of calcium is used as the neutralizing agent and hence, the formation of the water membrane peculiar to a hydrophilic surface is observed on the surface of the coating film. Here, a dynamic contact angle is 28°.

Also with respect to the coating Y8 which is a coating used as a control, hydroxide of iron having an ionic radius not larger than an ionic radius of calcium is used as a neutralizing agent and hence, the formation of a water membrane peculiar to a hydrophilic surface is observed on the coating surface. Here, a dynamic contact angle is 30°.

The coating Y2 is a silicate-based coating, and hydrophilic tendency is also observed with respect to the coating Y2 in the substantially same manner as the coating Y1. In addition, although a dynamic contact angle of the coating Y2 cannot be measured, it is suggested that the coating Y2 has a stronger hydrophilic tendency than the coating film formed of the coating Y1.

These results indicate that the photocatalytic coating of this embodiment can obtain the surface of the coating film having hydrophobicity by containing metal ion having ionic radius not larger less than an ionic radius of calcium.

[1-3. Verification of Coating Property]

Next, the difference in coating property between a coating which is provided with a surfactant and a coating which is not provided with a surfactant by using the coating X1 as a representative example is verified. In this test, a photocatalytic coating X6 of this embodiment (hereinafter, also referred to as "coating X6") is prepared. Although the coating X6 is prepared in the substantially same manner as the coating X1, the coating X6 differs from the coating X1 with respect to a point that diethyl polysiloxane which constitutes a surfactant is not filled in the coating X6.

The evaluation is made by five people who have sufficient knowledge on coating and a coating technique. The evaluation is made in such a manner that the coating X1 or the coating X6 is applied to a metal plate, a wood plate and a resin plate by coating respectively. As a result, all five evaluators evaluate that the coating X1 exhibits a superior coating property compared to the coating X6 in any cases where the coating X1 is applied to the metal plate, the wood plate and the resin plate. All five people also evaluate that, although the coating X6 has a slightly inferior coating property compared to the coating X1, the coating X6 still have a coating property sufficient for a practical use when applied on the metal plate, the wood plate and the resin plate respectively.

[1-4. Antifungal Effect Test of the Surface of the Coating Film]

Next, an antifungal effect test of respective coatings is performed. In this text, coating film samples where a coating film is formed by applying the respective coatings on a circular filter paper having a diameter of 3 cm are arranged in a culture plate which accommodates an agar culture medium for mold culture, and the respective coating film samples are inoculated with the same amount of mold. Four weeks after, areas in the coating film samples where the mold is grown are compared to each other. Here, the mold culture is performed under both conditions, that is a condition where an ultraviolet rays are irradiated and a dark condition.

The coating Y3 and the coating Y4 (hereinafter, also referred to as "coating Y3" and "coating Y4" respectively) which are newly prepared are used in the test in addition to the above-mentioned coating X1, X4, X5 of this embodiment. The coating Y3 is obtained by replacing the photocatalyst in the coating Y1 with an ultraviolet-ray excitation photocatalyst and the coating Y4 is obtained by replacing the photocatalyst in the coating Y2 with an ultraviolet-ray excitation photocatalyst.

Further, the test is also carried out with respect to a blank on which a filter paper to which no coating is applied is arranged in addition to the above-mentioned coatings X1, X4, X5, Y3, Y4. The result of this test is shown in Table 2.

TABLE 2

| | Photocatalyst | Mold prevention property evaluation Mold inhabiting range |
|---|---|---|
| UV irradiation | | |
| Blank | | 100% |
| Coating Y4 | Ultraviolet rays | 65% |
| Coating Y3 | Ultraviolet rays | 70% |
| Coating X4 | Visible light | 0% |
| Coating X5 | Visible light | 0% |
| Coating X1 | Visible light | 0% |
| Dark condition | | |
| Blank | | 100% |
| Coating Y4 | Ultraviolet rays | 100% |
| Coating Y3 | Ultraviolet rays | 100% |
| Coating X4 | Visible light | 0% |
| Coating X5 | Visible light | 0% |
| Coating X1 | Visible light | 0% |

Assuming a range of inhabitation of mold in the blank as 100%, the respective coating film samples are compared to each other. The range of inhabitation of mold is smallest in the coatings X1, X4, X5 irrespective of whether or not ultraviolet rays are irradiated.

Although the environment under the dark condition is environment where mold can easily inhabit compared to the environment under an ultraviolet ray irradiation condition, the propagation of the mold is substantially completely suppressed on the coating films of the coatings X1, X4, X5. It is thought that the coating films prevent the moisture containing nutrition of culture from permeating the coating films.

[1-5. Field Test in a Food Factory]

Next, the coatings X1, X4, X5, Y3, Y4 are applied to a wall surface of a food factory which produces prepared foods, and the degree of gathering of mold on the respective coating films are compared.

There is a large pot having a diameter of 1.5 m which is used for boiling prepared food near the wall surface where the test is performed. Since the wall surface is smeared by juice from the pot or the like, the wall surface is under a condition where mold easily propagates.

The test is performed for 11 months after the coating films are formed. Hereinafter, the growing state of mold after 11 months is shown in Table 7. In Table 7, "good" indicates that gathering of mold is not observed, "bad" indicates that gathering of mold is slightly observed, "very bad" indicates that gathering of mold is observed in approximately 80% of a coating film area and "extremely bad" indicates that gathering of mold is observed in the approximately whole coating film area.

TABLE 3

| Coating film forming coating | Photocatalyst | Result of test |
|---|---|---|
| Blank | | Extremely bad |
| Coating Y4 | Ultraviolet rays | Very bad |
| Coating Y3 | Ultraviolet rays | Very bad |
| Coating X1 | Visible light | Good |
| Coating X4 | Visible light | Good |
| Coating X5 | Visible light | Good |

As also shown in Table 3, in the test in the environment where the photocatalytic coating is practically used, the coating films formed of the coatings X1, X4, X5 exhibit excellent mold prevention property.

Particularly, it is an outstanding effect that, even in the indoors where a quantity of ultraviolet rays and visible light is small, the coatings X1, X4, X5 can suppress the gathering of mold to such a level shown in Table 3 without containing a chemical mold prevention component.

Further, although the coating films formed of the coating Y3 and the coating Y4 can acquire an antifungal effect compared to the blank, the propagation of the mold is observed in approximately 80% of the surface of the coating film so that it is difficult to say that the mold is virtually prevented.

[2-1. Test on Addition of Copper]

Next, an antibacterial effect, an antifungal effect and an antiviral effect when copper is added to a photocatalytic coating of this embodiment are studied.

Conventionally, it has been known that copper has an antimicrobial effect. However, there still remains an open space to be studied with respect to a method of adding copper to the photocatalytic coating.

That is, with the mere mixing of copper in a powder form into photocatalytic coating, copper content by weight in photocatalytic coating after preparation amounts to approximately 3 weight % at maximum so that a sufficient antimicrobial effect cannot be acquired.

In view of such circumstances, inventors of the present invention have made extensive studies and have found that photocatalytic coating can contain copper at a relatively high concentration by the following five methods (a) to (e).

To be more specific, (a) a method in which copper is carried on a surface of a photocatalyst and such a copper carrying photocatalyst is used, (b) a method in which a neutralizing agent which contains copper is used, (c) a method in which copper is bonded to a sulfo group of Nafion, (d) a method in which copper is mixed into a hydrophobic resin described later, and (e) a method which is any combination of the above-mentioned methods (a) to (d) can be named.

Due to such addition methods, a content of copper in photocatalytic coating can be elevated to 3 weight % or more thus realizing imparting of antimicrobial property which cannot be acquired heretofore. Hereinafter, the explanation is made with respect to a test which verifies an antimicrobial effect of a coating film formed of photocatalytic coating to which copper is added.

[2-2. Test Carried Out for Studying Copper Content]

Firstly, to study copper content which can exhibit a practically available antimicrobial effect, a test is carried out by adjusting a quantity of copper contained in photocatalytic coating to 3 weight %, 5 weight %, 6 weight % and 7 weight % respectively. Coating used in the test is the photocatalytic coating X2 of this embodiment explained hereinafter.

Photocatalytic coating X2 (hereinafter, also referred to as "coating X2") of this embodiment:

0.3 L of Nafion DE2020 (made by E.I. du Pont de Nemours & Company) is dispensed in a stainless steel vessel having a capacity of 2 L, 20 g to 60 g of Cu-carrying sulfur-doped photocatalytic titanium oxide (product of Toho Titanium Co., Ltd) is filled in the vessel, and further, 0.3 L of N-propanol is added as a solvent and 0.5 g to 2 g of $[Cu(NH_3)_4](OH)2$ is added as a neutralizing agent. These components and pigment dispersing glass beads are mixed with each other and, thereafter, the mixture is stirred at a temperature of 20° C. for 120 minutes using a stirrer thus preparing photocatalytic coating X2. Hereinafter, photocatalytic coating to which 3 weight % of copper is added is referred to as "coating X2-Cu3%", photocatalytic coating to which 5 weight % of copper is added is referred to as "coating X2-Cu5%", photocatalytic coating to which 6 weight % of copper is added is referred to as "coating X2-Cu6%" and photocatalytic coating to which 7 weight % of copper is added is referred to as "coating X2-Cu7%".

Next, the group of these coatings X2 are applied to coating objects respectively thus forming coating films. A culture solution (4.5 ×10⁵ cfu/ml) of colon bacillius is dropped on the coating films and the coating films are held at a room temperature for 12 hours thus allowing the study of the antimicrobial activity under the dark condition. Film thicknesses of the respective coating films are set equal.

As a result, although some antimicrobial effect is recognized with respect to the coating X2-Cu3% and the coating X2-Cu5% compared to the blank to which these coatings X2 are not applied, the antimicrobial effect is not at a practically usable level. To be more specific, the antimicrobial effect is at the level where the number of bacteria is at the order of approximately $10^5$ per 1 ml.

To the contrary, the number of bacteria at the order of $10^5$ is lowered to the order of $10^4$ with respect to the coating film formed of the coating X2-Cu6%. In the same manner, the number of bacteria is lowered to the order of $10^4$ with respect to the coating film formed of the coating X2-Cu7%. These results suggest that the photocatalytic coating of this embodiment can acquire a sterilizing effect even under the dark condition by setting the content of copper to 6% or more. The fact that the sterilizing effect can be acquired under the dark condition implies that the sterilizing effect under the bright condition can also be further enhanced due to a synergistic effect of the sterilizing effect brought about by the excitation of the photocatalyst and the sterilizing effect attributed to copper.

[2-3. Study of Antimicrobial Effect Based on Difference in Film Thickness]

Next, the antimicrobial effect based on difference in thickness of the formed film is studied using the above-mentioned coating X2-Cu6%.

The coating film is formed by applying the coating X2-Cu6% to the coating object by coating and by drying the coating X2-Cu6%. The film thickness of the formed coating film is set to two kinds, that is, 1 μm and 5 μm.

As the illumination condition, the bright condition and the dark condition are used. In the bright condition, the test is carried out under two conditions of 200±50 Lux and 900±50 Lux using a fluorescent lamp (Mellow White FL10_NX made by Toshiba Inc).

Further, the test time is 8 hours at a room temperature, and 300 μl of culture solution of colon bacillius is dropped onto the coating film.

Further, the evaluation is made by calculating antimicrobial activity values using the following antimicrobial activity value calculation formula and by comparing these values.

Light irradiation antimicrobial activity value $R=[\log (B/A)]-[\log (C/A)]=[\log(B/C)]$ Dark condition antimicrobial activity value $R=[\log(B'/A)]-[\log (C'/A)]=[\log(B'/C')]$ In the formula, A is the number of viable bacteria on the blank immediately after inoculation, B is the number of viable bacteria on the blank after cultivation with irradiation of light, C is the number of viable bacteria on the specimen after cultivation with irradiation of light, B' is the number of viable bacteria on the blank after cultivation under dark condition, and C' is the number of viable bacteria on the specimen after cultivation under dark condition.

A, B, B' in the above-mentioned formula are set to values in the following Table 4.

TABLE 4

|    | 200 Lux | 900 Lux |
|----|---------|---------|
| A  | $4.1 \times 10^5$ | $2.0 \times 10^5$ |
| B  | $3.7 \times 10^5$ | $1.8 \times 10^5$ |
| B' | $1.7 \times 10^6$ | $2.2 \times 10^5$ |

*Unit: cfu/ml

FIG. 2 shows the test result of this test. As can be understood from the result shown in FIG. 2, the coating film having a film thickness of 5 μm exhibits high antimicrobial activity compared to the coating film having a film thickness of 1 μm.

From the above, it is thought that the coating film formed of the coating X2-Cu6% has the large network structure so that copper can relatively freely move through the gaps of the mesh whereby the larger the film thickness becomes, the larger quantity of copper acts on bacteria.

[2.4 Study of Antifungal Effect Based on Difference in Film Thickness]

Next, the antifungal effect based on difference in thickness of the formed film is studied using the above-mentioned coating X2-Cu6%.

With respect to the test conditions, the test is carried out under two kinds of bright conditions (900 LuX, 200 Lux) and other test conditions are substantially equal to the corresponding conditions of the above-mentioned [Study of antimicrobial effect based on difference in film thickness]. A, B in the above-mentioned antimicrobial activity value calculation formula are set to values in the following Table 5.

TABLE 5

|   | 200 Lux | 900 Lux |
|---|---------|---------|
| A | $3.3 \times 10^5$ | $3.1 \times 10^5$ |
| B | $2.4 \times 10^5$ | $2.7 \times 10^5$ |

*Unit: cfu/ml

FIG. 3 shows the test result of this test. From the result shown in FIG. 3, it is understood that the coating film formed of the coating X2-Cu6% exhibits the excellent antifungal activity also against mold. Further, it is understood that the coating film having a film thickness of 5 μm exhibits the higher antifungal activity compared to the coating film having a film thickness of 1 μm. Particularly, even under the condition where the illuminance is only 200 Lux at maximum, the number of bacteria at the order of $10^5$ can be lowered to the order of $10^4$.

Also from such result, in the same manner as the previous [Study of antimicrobial effect based on difference in film thickness], it is thought that the coating film formed of the coating X2-Cu6% has the large network structure so that copper can relatively freely move through the gaps of the mesh whereby the larger the film thickness becomes, the larger quantity of copper acts on mold.

[2-5. Field Test in Shochu (Rough Distilled Spirits) Plant]

Next, a coating film is formed on a wall surface of a shochu plant using the above-mentioned coating X2-Cu6%, and the test is carried out to confirm the mold prevention property of the coating film. Shochu is manufactured using aspergillus and hence, there is a tendency that mold vigorously propagates on a wall surface in the plant. Also in this test, a wall surface on which black aspergillus propagates over the whole surface is selected as a testing place.

The test is carried out in such a manner that a plastic plate on which a coating film is formed is adhered to the wall surface, and the evaluation is made by comparing, with naked eyes, a degree of growth of the mold on the coating film after a lapse of nine months and the degree of growth of the mold on the coating film after a lapse of 24 months. The coatings used in the formation of the coating films are, in addition to the previously mentioned coating X2-Cu6%, a general urethane resin-based coating to which a photocatalyst is not added (hereinafter referred to as "coating Y5"), a mold prevention coating formed by impregnating mold prevention component (SAN-AI ZOL (made by SAN-AI OIL Co., Ltd.)) into the coating Y5 (hereinafter referred to as "coating Y6"), and a commercially available photocatalytic coating (itosic: hereinafter referred to as "coating Y7") made by Daido Corporation as control coatings. The result of this test is shown in Table 6. In Table, "good" indicates a state where no propagation of mold is recognized on a surface of the coating film, and "bad" indicates a state where the propagation of mold is recognized on the surface of the coating film.

TABLE 6

| Kind of coating | Mold prevention property | |
|---|---|---|
| | 9 months | 24 months |
| Coating Y5 | Bad | Bad |
| Coating Y6 | Good | Bad |
| Coating Y7 | Bad | Bad |
| Coating X2-Cu6% | Good | Good |

As can be understood from Table 6, with respect to the coating Y5 which is the general urethane coating, the propagation of mold is already recognized after a lapse of 9 months from the start of the test and, further, the remarkable propagation is recognized after a lapse of 24 months from the start of the test.

With respect to the coating Y6 which contains the mold prevention component, at a point of time that 9 months elapses from the start of the test, no mold is recognized on the surface of the coating film so that the antifungal effect attributed to the mold prevention component is confirmed. However, after a lapse of 24 months, the remarkable propagation of the mold is recognized on the surface of the coating film.

With respect to the coating Y7 which contains the photocatalyst, the gathering of mold is recognized at a point of time that 7 months elapse. Further, the degree of propagation of mold on the surface of the coating film at this point is extremely higher than the degree of propagation of mold on the surface of the coating film formed of the coating Y5 at the same point of time. It is thought that the photocatalyst makes the surface of the coating film hydrophilic so that water is adsorbed in the surface of the coating film whereby the propagation of mold is promoted.

To the contrary, with respect to the coating X2-Cu6%, the gathering of mold is not recognized both after a lapse of 9 months and after a lapse of 24 months. From this result, it is understood that the photocatalytic coating of this embodiment possesses the extremely effective mold prevention action. Further, on the surface of the coating film formed of the coating X2-Cu6%, the adhesion of dirt is hardly recognized even in comparison with portions of the surface of the coating film formed of other coatings where the mold is not gathered. It is thought that the adhesion of the dirt is suppressed due to a water repellency effect of the photocatalytic coating of this embodiment.

[2-6. Field Test in Hams and Sausages Plant]

Next, in the same manner as the previously-mentioned [Field test in shochu plant], the coating film is formed on a wall surface of a hams and sausages plant using the coating X2-Cu6%, and a test is carried out to confirm the mold prevention property. The coatings used in the test are the coating X2-Cu6% and the coating Y5 described previously, and a test period is set to 5 months. Since the testing method is substantially equal to the testing method used in [Field test in shochu plant], the explanation of the testing method is omitted. The result of the test is shown in Table 7.

TABLE 7

| | Mold prevention property |
|---|---|
| Coating Y5 | Bad |
| Coating X2-Cu6% | Good |

As shown in Table 7, the gathering of mold is recognized on the surface of the coating film after a lapse of 5 months from the start of the test with respect to the coating Y5. However, the gathering of mold is not recognized on the surface of the coating film formed of the coating X2-Cu6% after a lapse of 5 months from the start of the test.

[2-7. Antiviral Action Verifying Test]

Next, a test is carried out for verifying an antiviral action of the photocatalytic coating of this embodiment. The coating used in the test is the previously-mentioned coating X2-Cu6%, and a film thickness of the coating film is set to 5 μm. The result of the test is shown in Table 8.

TABLE 8

| | | | logTCID50/ml | |
|---|---|---|---|---|
| Virus used in test | Measurement | Object | Under light irradiated condition | Under light blocked condition |
| Influenza virus | Immediately after inoculation | Control | 5.7 | 5.7 |
| | After 6 hours | Specimen | 3.5 | 3.5 |
| | | Control | 5.3 | 5.3 |

Log TCID: median lissue culture inicclious 50% tissue cultivation infected quantity
Control: plastic culture plate
Light irradiation condition: 2000 Lux, white fluorescent lamp As can be understood from Table 8, it is confirmed that the surface of the coating film formed of the coating X2-Cu6% has an antiviral action. Further, what must be noted particularly here is that the coating film acquires the antiviral action also under a light blocked condition in the same manner as under a light irradiated condition.

As has been explained above, it is understood that the photocatalytic coating of this embodiment can acquire an extremely excellent antimicrobial effect, an extremely excellent antiviral effect and an extremely excellent antifungal effect under the low illuminance condition or under the dark condition. The photocatalytic coating which can acquire such advantageous effects is unparalleled to other photocatalytic coatings known to the inventors of the present invention so far.

Next, the explanation is made with respect to the photocatalytic coating of this embodiment which is prepared by adding a hydrophobic resin (hereinafter also referred to as hydrophobic-resin-added photocatalytic coating).

Figure 4A:
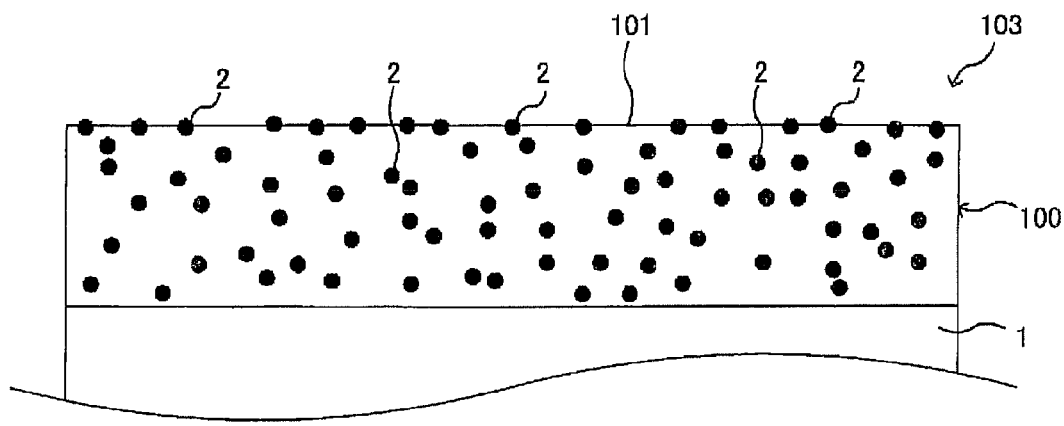
FIG. 4A is an explanatory view showing a cross section of a coating film formed of a conventional photocatalytic coating.
Figure 4B:
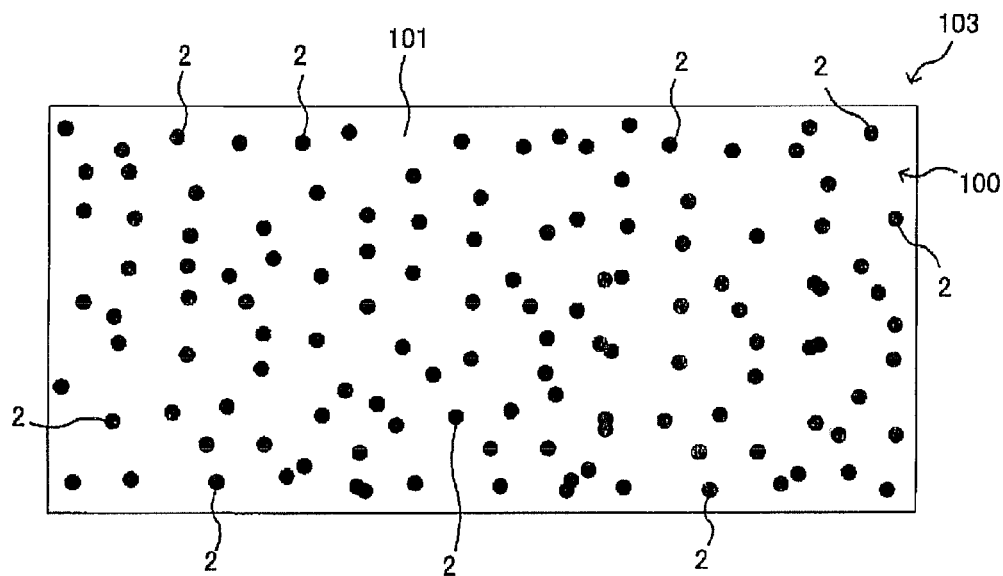
FIG. 4B is an explanatory view showing a coating film formed of a conventional photocatalytic coating as viewed in a plan view.
Figure 4C:
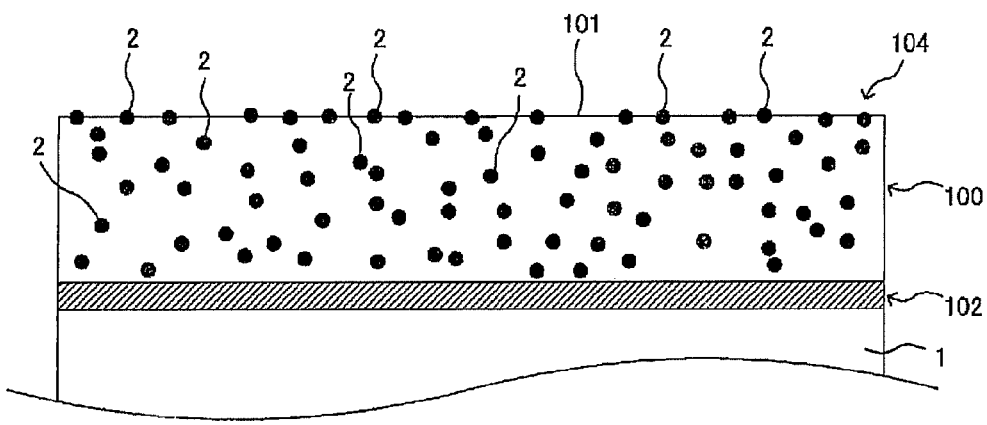
FIG. 4C is an explanatory view showing the coating film structure of the conventional photocatalytic coating.
Figure 5A:
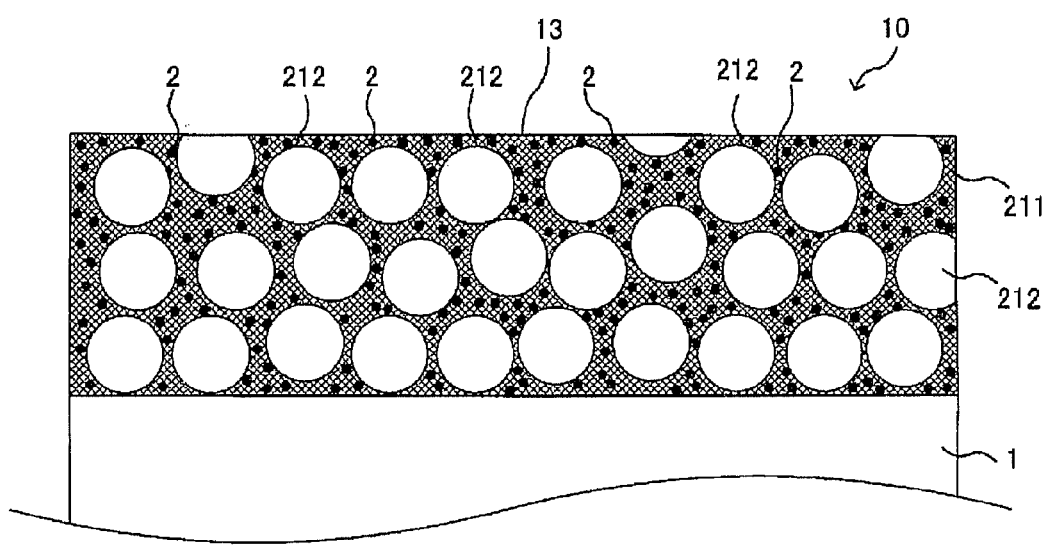
FIG. 5A is an explanatory view showing the coating film cross-sectional structure of the photocatalytic coating according to the embodiment of the present invention.
Figure 5B:
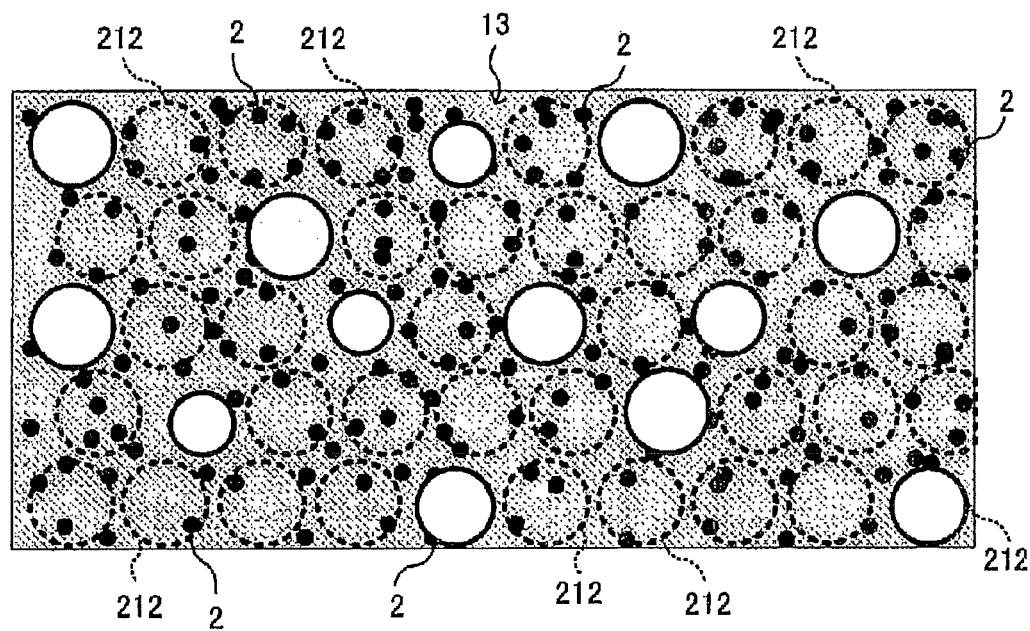
FIG. 5B is an explanatory view showing the coating film formed of a photocatalytic coating according to the embodiment of the present invention as viewed in a plan view.
Figure 6:
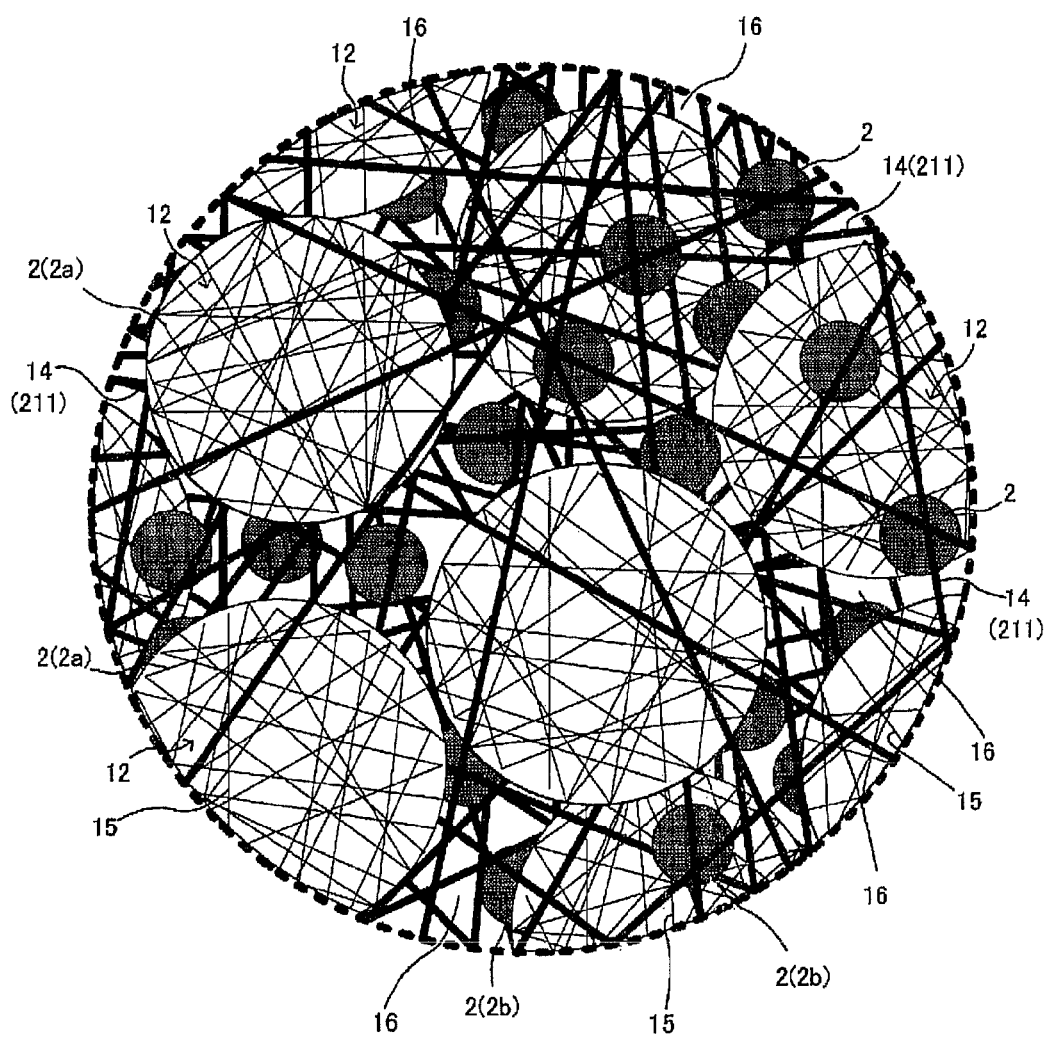
FIG. 6 is a schematic explanatory view showing the coating film according to the present invention in an enlarged manner.

Firstly, to facilitate the understanding of the photocatalytic coating, the difference in structure between the coating film formed of the conventional photocatalytic coating and the coating film formed of the hydrophobic-resin-added photocatalytic coating is explained in conjunction with FIG. 4 to FIG. 6. FIG. 4 to FIG. 6 show the structure of the photocatalytic coating schematically and hence, a film thickness, a particle size, a rate of the size of mesh structure described later are not always accurate. Further, a shape of the particle is formed into a circular shape to facilitate the explanation of the photocatalytic coating.

FIG. 4 is the explanatory view showing the coating film structure 103 in which a coating film 100 is formed by applying a conventional photocatalytic coating to a base material 1 which is an object on which a coating film is formed. The conventional photocatalytic coating has the structure where photocatalyst particles 2 are dispersed in a coating base and hence, as shown in FIG. 4A which is a cross-sectional view of the coating film structure 103, photocatalyst particles 2 are substantially uniformly present in the coating film 100.

Further, as shown in FIG. 4B, the photocatalyst particles 2 are partially exposed on a coating film surface 101, and a photocatalytic effect is generated when an excitation light such as ultraviolet rays or visible light beams are irradiated to the photocatalyst particles 2.

However, many coating bases among coating bases used in conventional photocatalytic coating are made of an organic resin which exhibits low resistance against a photocatalytic effect which the photocatalyst particles 2 generate and hence, the durability of the coating film 100 is remarkably damaged because of the use of the organic resin.

Further, when the base material 1 is made of an organic resin, there may be a case where a photocatalytic effect erodes not only the coating film 100 but also the base material 1. Accordingly, to protect the base material 1, as shown in FIG. 4C, there has been proposed the coating film structure 104 where a protective layer 102 made of a resin which is hardly eroded by a photocatalytic effect is interposed between the base material 1 and the coating film 100.

In this method, however, the durability of the coating film 100 is not improved. Further, to form the coating film structure 104, treatment in two stages consisting of a step in which the protective layer 102 is firstly formed on the base material 1 and a step in which the coating film 100 is formed is required and hence, the steps become cumbersome.

To the contrary, according to the photocatalytic coating of this embodiment, a photocatalytic coating is prepared by dispersing or dissolving at least a photocatalyst, a tetrafluoroethylene-based resin obtained by graft polymerization of a sulfonic acid, a compound containing metal ion having an ionic radius not less than an ionic radius of calcium and/or complex ion having an ionic radius not less than the ionic radius of calcium into a solvent, and a hydrophobic resin having compatibility is added to the photocatalytic coating thus preparing the hydrophobic-resin-added photocatalytic coating.

The coating film structure 10 formed of the hydrophobic-resin-added photocatalytic coating forms the characteristic structure shown in FIG. 5.

That is, on the base material 1, the coating film structure 10 is formed. In the coating film structure 10, photocatalyst particles 2 and hydrophobic resin regions 212 are dispersed in a region formed of Nafion indicated by half-tone dot meshing in the drawing (hereinafter referred to as a Nafion region 211). In FIG. 5 and FIG. 6 described later, the hydrophobic resin regions 212 are shown in a state where the hydrophobic resin regions 212 have a complete round shape or a spherical shape and are arranged neatly. However, the hydrophobic resin regions 212 are schematically shown for facilitating the explanation of the photocatalytic coating, and in an actual state, the hydrophobic resin regions 212 have a more complicated shape and are arranged in a more dispersed state. Further, a rate that the hydrophobic resin regions 212 are exposed to a surface is not always described accurately.

The hydrophobic resin region 212 is a hydrophobic region formed of a hydrophobic resin such as a fluoric resin and/or an acrylic silicon resin and has water repellency property.

Further, as shown in FIG. 5B which is a plan view of a front layer portion 13, the front layer portion 13 of the coating film structure 10 is uniformly covered with the Nafion region 211 having a small thickness so that some of the hydrophobic resin regions 212 are exposed.

The Nafion region 211 and the hydrophobic resin regions 212 have the network structure due to respective resins and allow water in a molecular form (for example, in a gaseous formula) to pass therethrough while preventing water in a liquid form from passing therethrough.

This structure is further explained in conjunction with FIG. 6. FIG. 6 is an enlarged schematic view of a surface layer part 13 as viewed in a plan view, and is expressed such that the surface layer part 13 has a depth in the thickness direction of the film. In FIG. 6, Nafion resin chains 14 which constitute the Nafion region 211 are indicated by a black bold line, the photocatalyst particles 2 are indicated by a meshing small circle, the hydrophobic resin regions 212 are indicated by a slightly larger circle, and hydrophobic resin chains 15 which constitute the hydrophobic resin regions 212 are indicated by fine lines.

As also shown in FIG. 6, the hydrophobic resin regions 212 and the photocatalyst particles 2 are arranged in the Nafion region 211 in a dispersed state, and the surface layer is covered with the Nafion resin chains 14.

Further, in each mesh of the Naftion resin chains 14, a mesh foamed of the hydrophobic resin chains 15 is formed in places as the hydrophobic resin regions 212 thus preventing the intrusion of water.

The Nafion resin chains 14 are hardly deteriorated by the photocatalytic effect which the photocatalyst particles 2 generate and hence, the deterioration of the coating film structure 10 per se can be prevented.

In the coating film formed in this manner, although a static contact angle exhibits hydrophobicity, a dynamic contact angle when vibrations are imparted to the coating film exhibits hydrophilicity.

That is, even when the photocatalyst particles 2 are excited, the coating (the coating film structure 10) per se is hardly eroded and, due to the hydrophobic resin regions 212, a coating surface with strong hydrophobic tendency can be formed thus suppressing the propagation of mold and microorganism.

A gap 16 defined between a plurality of hydrophobic resin regions 212 which are dispersed in the Nafion region 211 allows water in a molecular form to pass therethrough and hence, it is possible to supply an amount of moisture necessary for a photocatalytic reaction also to the photocatalyst particles 2b and the like present in slightly deep areas of the coating film.

To summarize the above, in the conventional coating film structure 103 or the coating film structure 104, when the photocatalyst particles 2 are excited, the coating film surface 101 never fails to become strongly hydrophilic. To the contrary, according to the photocatalytic coating of this embodiment which is prepared by adding the hydrophobic resin to the photocatalytic coating, the coating surface having strong hydrophobic tendency can be formed and, further, it is possible to provide the photocatalytic coating whose cost per unit amount is low. Further, by suitably changing a mixing rate of the hydrophobic resin to be added to the photocatalytic coating of this embodiment, it is possible to adjust the degree of hydrophilicity (the degree of hydrophobicity) of the coating surface.

To explain more, in the coating film surface and the inside of the coating film formed of the conventional photocatalytic coating, when the photocatalyst is excited, the photocatalytic action is generated so largely that the coating film surface or the inside of the coating film becomes only hydrophilic and hence, the conventional photocatalytic coating cannot be used conveniently in a state where the excessive adsorption of water is not desirable, for example, in a case where the coating film surface or the inside of the coating film requires an antifungal effect and an antimicrobial effect.

To the contrary, in the coating film surface or the inside of the coating film formed of the photocatalytic coating of this embodiment which is prepared by adding the hydrophobic resin to the photocatalytic coating, a phenomenon that the hydrophilicity progresses due to the excitation can be suppressed and hence, in a scene where hydrophilicity becomes an obstacle such as a scene which requires an antifungal effect and an antimicrobial effect, a unique phenomenon where hydrophilicity which is useful in self cleaning or the like originally is not so elevated or is hardly elevated occurs.

To explain the technical feature of the photocatalytic coating of this embodiment more specifically, as the hydrophilic resin, a resin which exhibits resistance against a peroxide which is generated by a photocatalyst such as a tetrafluoroethylene-based resin obtained by graft polymerization of a sulfonic acid is used. It is thought that a photocatalyst is dispersed in such a hydrophilic resin, and a fine droplet of a hydrophilic resin which embraces the photocatalyst is dispersed in the hydrophobic resin thus realizing the photocatalytic coating which exhibits strong resistance against an oxidation reaction of the photocatalyst and also can form a hydrophobic surface. That is, one of the technical features of the photocatalytic coating of this embodiment lies in that the hydrophobic resin and the photocatalyst are not brought into direct contact with each other.

Nafion which has PTFE as a basic skeleton is regarded completely equal to PTFE per se with respect to (electric) chemical stability, flexibility, high water repellency during drying and the like. However, Nafion exhibits extremely high affinity with water being influenced by a sulfo group and, further, proton (hydrogen ion) freely moves in a solid body of Nafion and hence, Nafion also possesses favorable ion conductivity.

Further, while PTFE per se is insoluble to any solvent so that the formation of film made of PTFE in a single body is only possible through dissolving by heating at a temperature of 300° C. or more, it is well-known that Nafion is favorably dissolved in an alcohol-based solvent besides water.

Nafion is a long high-polymer having a molecular weight of 200,000 and hence, Nafion forms a film due to evaporation of water or a solvent and does not cause a hardening reaction.

Further, as the most outstanding characteristic, although Nafion is a water-soluble resin, Nafion does not exhibit water solubility at all after the film is fanned by hardening.

In general, water solubility remains in a water-soluble resin after a film is formed by curing and hence, the water-soluble resin is liable to be dissolved in water again and exhibits poor waterproof property. However, Nafion is a macro molecule having an average molecular weight of 200,000 or more. Although this molecular weight originally falls within a molecular weight region where Nafion is expected to be a high-polymer of extremely high viscosity, an interaction is generated within chains of linear-chained molecules, and Nafion is dispersed in a granular folded manner as in the case of folding of protein and hence, Nafion is stable as a solution of relatively low viscosity. Accordingly, once a film made of Nafion is formed, Nafion becomes a high-polymer film of macro molecular weight thus exhibiting properties which are hardly conceivable with other resins.

It is most desirable for the resin which carries the photocatalyst thereon in the form of a film to have properties that the photocatalytic action is based on photoelectron-chemical decomposition of water, and the resin is stable against generated peroxide, has no water solubility at all and allows water to be impregnated in the layer thereof. The above-mentioned respective properties of Nafion exactly correspond to such properties.

Further, even when the photocatalyst is excited, Nafion is hardly eroded by generated peroxide or the like.

Then, by dispersing the photocatalyst in the hydrophilic resin and by allowing the hydrophilic resin to embrace the photocatalyst in the hydrophobic resin, the direct contact between the photocatalyst and the hydrophobic resin can be prevented as much as possible whereby it is possible to prepare the photocatalytic coating which can form the hydrophobic coating film and also is hardly eroded by the photocatalyst.

Bacteria and mold have tendency that they grow rapidly in places where an amount of moisture is large. Although attempts to suppress the growth of bacteria and mold by a photocatalytic action have been made recently, in an antimicrobial action and a mold prevention action on a coating surface of a photocatalytic coating which has been proposed up to now, an excited photocatalyst strongly adsorbs moisture to the coating surface and hence, there has been a case where the photocatalytic action promotes the growth of bacteria and mold to the contrary.

The photocatalytic coating of this embodiment which is prepared by adding the hydrophobic resin can efficiently acquire an antimicrobial effect and an antifungal effect by controlling moisture adsorbed in a coating surface in such a manner that an addition rate of the hydrophobic resin is changed so as to adjust the degree of hydrophilicity of the coating surface.

Further, while it is thought that the photocatalyst possesses a deodorizing effect and can decompose volatile harmful substances and the like, in general, odor substances and volatile substances are substances having high hydrophobicity in many cases.

Accordingly, the coating film surface which is formed of the photocatalytic coating of this embodiment prepared by adding the hydrophobic resin to the photocatalytic coating can adsorb these substances more efficiently and hence, a deodorizing function and a decomposition function can be effectively generated whereby the deodorization can be performed and the volatile harmful substances or the like can be reduced.

Figure 7:
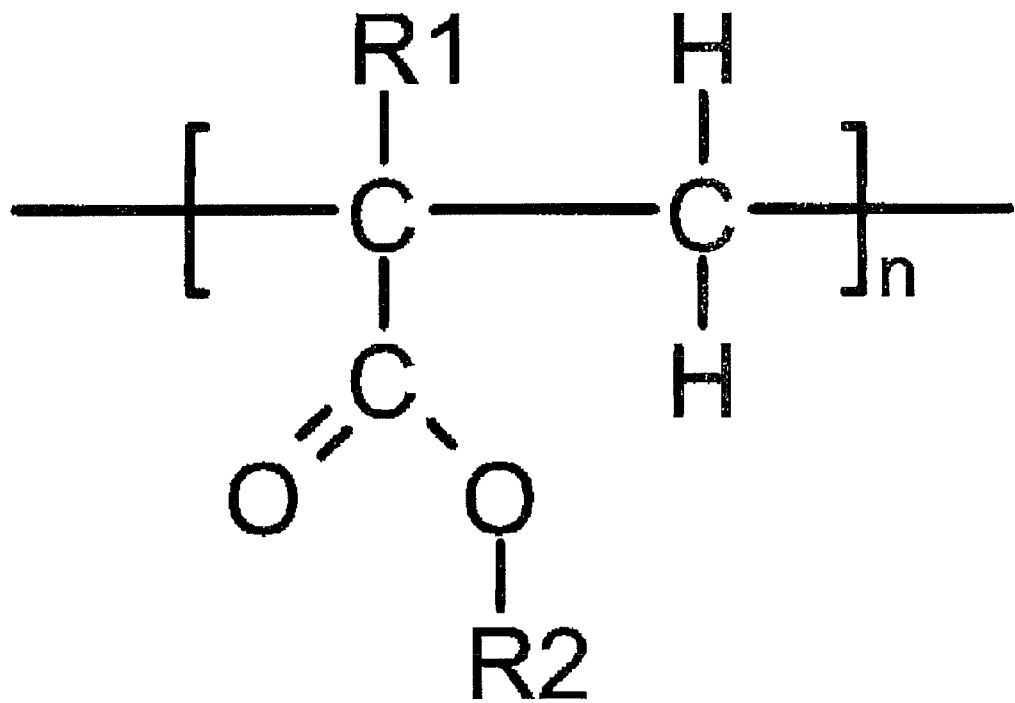
FIG. 7 is an explanatory view showing components used in the photocatalytic coating.

As the hydrophobic resin, a resin which contains a fluoro-resin, an acrylic silicon resin or a vinyl chloride resin as a main component can be preferably used. The acrylic silicon resin is a substance which has the basic structure shown in FIG. 7, for example.

The fluoro-resin and the acrylic silicon resin are, different from the above-mentioned Nafion, resins having hydrophobicity and have a function of weakening super-hydrophilicity of the photocatalyst on the coating surface in appearance.

Further, although the fluoro-resin and the acrylic silicon resin possess relatively small resistance against peroxide which is generated when the photocatalyst is excited, the photocatalyst per se is firstly coated with the hydrophilic resin which possesses resistance against peroxide and hence, these hydrophobic resins are hardly subject to the direct decomposition by peroxide. Further, these hydrophobic resins possess outstanding resistance against UV rays and hence, due to the combination of the hydrophobic resin and the hydrophilic resin, it is possible to prepare the photocatalytic coating which can form the coating film having not only high resistance against peroxide which the photocatalyst generates but also high resistance against UV rays.

Further, by adopting a fluoro-resin or an acrylic silicon resin with high alcohol resistance property as the hydrophobic resin, it is possible to enhance alcohol resistance property of the photocatalytic coating. That is, although Nafion resin is a resin with relatively low alcohol resistance, it is possible to enhance the alcohol resistance property of the formed coating film by adding a hydrophobic resin such as a fluoro-resin or an acrylic silicon resin into the Nafion resin.

Further, the hydrophobic resin may be prepared using emulsion formed by combining two or more kinds selected from a group consisting of the above-mentioned fluoro-resin, acrylic silicon resin and vinyl chloride resin as a main component. It is desirable that these hydrophobic resins are water-repellant resins which exhibit high water repellency in which a dry coating film exhibits a contact angle of 95° or more with water (either dynamic or static) or the mixture of these resins.

Further, the photocatalytic coating film may have the surface structure with enhanced hydrophobicity by applying the above-mentioned photocatalytic coating of this embodiment to a coating object and drying the photocatalytic coating thus forming the coating film and, thereafter, by causing a reaction between a surface of the coating film and a silane coupling agent.

In this embodiment, the silane coupling agent is not particularly limited and, for example, trichloro-n-octylsilane, tridecafluoro-1,1,2,2-tetrahydrooctyl trichlorosilane or phenethyl trichlorosilane can be used as the silane coupling agent.

To be more specific, a silane coupling reaction liquid may be prepared by adding the silane coupling agent to a predetermined solvent (for example, ethanol, toluene, isopropanol) or the like and by stirring the mixture, and the silane coupling reaction liquid may be brought into contact with a surface of the coating film formed of the photocatalytic coating of this embodiment thus causing the silane coupling reaction.

The manner of bringing the silane coupling reaction liquid into contact with the surface of the coating film is not particularly limited, and the silane coupling reaction liquid may be applied to the surface of the coating film using a brush, a writing brush, a roller or the like or the silane coupling reaction liquid may be sprayed to the surface of the coating film in an aerosol state by a sprayer.

By causing the silane coupling reaction between the resin and the photocatalyst which constitute the surface of the coating film and the silane coupling reaction liquid, it is possible to make the surface of the coating film more hydrophobic.

It is preferable to make the silane coupling reaction liquid react with the surface of the coating film in a state where a light which can excite the photocatalyst is irradiated to the reaction surface.

The light may be ultraviolet rays or the light may be a visible light when the photocatalyst can be excited by the visible light.

In a state where the light is irradiated to the surface of the coating film, the photocatalyst is excited and a large number of OH groups appear on a surface of the photocatalyst and hence, the efficiency of reaction between the photocatalyst and the silane coupling agent can be enhanced.

Further, from another viewpoint, the degree of hydrophobicity can be adjusted by controlling a speed of a silane coupling reaction between the silane coupling agent and the photocatalyst by changing an irradiation quantity of light.

[3-1. Preparation of Hydrophobic-Resin-Added Photocatalytic Coating]

Hereinafter, the preparation of the photocatalytic coating of this embodiment to which the hydrophobic resin is added is explained in detail. In the explanation made hereinafter, 4 kinds of photocatalytic coatings A to D of this embodiment and a conventional photocatalytic coating E are prepared, and coating films are formed on a wall surface using the photocatalytic coatings A to E and are used for a mold prevention test. Firstly, the steps of preparing the photocatalytic coatings A to E are explained.

[3-2. Preparation of Hydrophobic-Resin-Added Photocatalytic Coating A]

0.2 L of Nafion DE2020 (product of E.I. du Pont de Nemours & Company) is dispensed in a stainless steel vessel having a capacity of 2 L, 30 g of photocatalytic titanium oxide ST-01 having an average primary particle size of 6 nm (product of ISHIHARA SANGYO KAISHA, LTD.), 2 g of barium hydroxide and 0.3 g of diethyl polysiloxane are filled in the vessel, and further, 0.2 L of isopropanol and 0.2 L of water are added. These components and pigment dispersing glass beads are mixed together and, thereafter, the mixture is stirred at a temperature of 20° C. for 120 minutes using a stirrer.

Then, 0.1 L of fluoro-resin Lumifron FE4400 (product of ASAHI GLASS CO., LTD.) is added to the mixture liquid as a hydrophobic resin and the mixture liquid is further stirred at a temperature of 20° C. for 3 minutes thus preparing the hydrophobic-resin-added photocatalytic coating A.

[3-3. Preparation of Hydrophobic-Resin-Added Photocatalytic Coating B]

0.085 L of hydrolytic siloxane-based resin MS56 (product of MITSHUBISHI CHEMICAL CORPORATION) is dispensed in a stainless steel vessel having a capacity of 2 L, 30 g of sulfur-doped photocatalytic titanium oxide PP2Y (product of Toho Titanium Co., Ltd.), 2 g of barium hydroxide and 0.3 g of diethyl polysiloxane are filled in the vessel, and further, 0.3 L of N-propanol is added as a solvent. These components and pigment dispersing glass beads are mixed together and, thereafter, the mixture liquid is stirred at a temperature of 20° C. for 120 minutes using a stirrer.

Then, 0.1 L of hydrophobic silicone resin Polysol AP-3900 (product of SHOWA HIGHPOLYMER CO., LTD.) is added to the mixture liquid as a hydrophobic resin, and the mixture liquid is further stirred at a temperature of 20° C. for 3 minutes thus preparing the hydrophobic-resin-added photocatalytic coating B.

[3-4. Preparation of Hydrophobic-Resin-Added Photocatalytic Coating C]

0.1 L of Nafion DE2020 (made by E.I. du Pont de Nemours & Company) and 0.04 L of hydrolytic siloxane-based resin methyl silicate A53 (product of COLCOAT CO., Ltd.) are dispensed in a stainless steel vessel having a capacity of 2 L, 40 g of sulfur-doped photocatalytic titanium oxide PP2Y, 2 g of barium hydroxide and 0.3 g of diethyl polysiloxane are filled in the vessel, and further, 0.2 L of isopanol and 0.2 L of water are added. These components and pigment dispersing glass beads are mixed together and, thereafter, the mixture is stirred at a temperature of 20° C. for 120 minutes using a stirrer.

Then, 0.05 L of fluoro-resin Lumifron FE4300 (product of ASAHI GLASS CO., LTD.) and 0.05 L of hydrophobic acrylic silicon resin polysol AP-3900 (product of SHOWA HIGHPOLYMER CO., LTD.) are added to the mixture liquid as a hydrophobic resin and the mixture liquid is stirred at a temperature of 20° C. for 3 minutes thus preparing the hydrophobic-resin-added photocatalytic coating C.

[3-5. Preparation of Hydrophobic-Resin-Added Photocatalytic Coating D]

0.2 L of Nafion DE2020 (product of E.I. du Pont de Nemours & Company) is dispensed in a stainless steel vessel having a capacity of 2 L, 30 g of photocatalytic titanium oxide ST-01 (product of ISHIHARA SANGYO KAISHA, LTD.) having an average primary particle size of 6 nm, 2 g of barium hydroxide and 0.3 g of diethyl polysiloxane are filled in the vessel, and further, 0.2 L of isopropanol and 0.2 L of water are added. These components and pigment dispersing glass beads are mixed together and, thereafter, the mixture is stirred at a temperature of 20° C. for 120 minutes using a stirrer.

Then, 0.125 L of water-dispersed polyester resin Byronal MD-1100 (product of TOYOBO CO., LTD.) is added to the mixture liquid as a hydrophobic resin and the mixture liquid is stirred at a temperature of 20° C. for 3 minutes thus preparing the hydrophobic-resin-added photocatalytic coating D.

[3-6. Preparation of Photocatalytic Coating E]

0.2 L of high-polymer acrylic acid resin Julimer AC-10H (product of NIPPON JUNYAKU KK) is dispensed as a hydrophobic resin in a stainless steel vessel having a capacity of 2 L, 40 g of sulfur-doped photocatalytic titanium oxide PP2Y (product of Toho Titanium Co., Ltd.) is filled in the vessel, and further, 0.2 L of isopropanol and 0.2 L of water are added. These components and pigment dispersing glass beads are mixed together and, thereafter, the mixture is stirred at a temperature of 20° C. for 120 minutes using a stirrer.

Then, 0.125 L of water-dispersed polyester resin Byronal MD-1100 (product of TOYOBO CO., LTD.) is added into the mixture liquid as a hydrophobic resin thus preparing the photocatalytic coating E.

The photocatalytic coatings A to E are prepared in accordance with the above-mentioned steps. Table 9 shows the compositions of the respective photocatalytic coatings collectively.

[3-7. Mold Prevention Test Using Photocatalytic Coatings A to E]

Next, the mold prevention test which is carried out using the prepared photocatalytic coatings A to E is explained in conjunction with FIG. 8. FIG. 8 is an explanatory view showing wall surfaces P to which respective photocatalytic coatings A to E are applied in the test.

The test is carried out on a wall surface P which is provided in the vicinity of a water using area in a food processing factory. The wall surface P is a place where mold is liable to grow thus causing a problem in the factory. Further, it is confirmed that the mold grows on the wall surface P substantially uniformly in the lateral direction.

Six zones each of which has a size of 20 cm×30 cm are defined on the above-mentioned wall surface, respective photocatalytic coatings A to E amounting to approximately 12 mL are respectively applied to 5 zones out of 6 zones by coating, and the coatings are naturally dried at a temperature of approximately 25° C. for 14 days thus forming coating films.

Further, silane treatment is applied to a right half of the respective zones on which the coating films are formed of the photocatalytic coatings A to E. The silane treatment is performed such that, in a state where the factory is illuminated, a silane coupling reaction liquid is applied to a surface of the coating films formed by drying the coatings A to E, using a brush.

The silane coupling reaction liquid is prepared such that 294 ml of ethanol is dispensed in a 500 ml beaker, 6 ml of trichloro-n-octylsilane is added to ethanol, and the mixture liquid is stirred for 10 minutes by a stirrer thus sufficiently dissolving trichloro-n-octylsilane in ethanol.

Angles described below coating surfaces P-1 to P-12 in FIG. 1 indicate a contact angle which is made with water (dynamic contact angle), and is an index of hydrophobicity (hydrophilicity). That is, the contact angle made between the coating surface P-1 and water is 20 degrees, the contact angle made between the coating surface P-2 and water is 70 degrees, the contact angle made between the coating surface P-3 and water is 15 degrees, the contact angle made between the coating surface P-4 and water is 60 degrees, contact angle

TABLE 9

| | Hydrophilic resin | Hydrophobic resin | Photocatalyst | Neutralizing agent | Surfactant |
|---|---|---|---|---|---|
| Photocatalytic coating A | Nafion | Fluoro-resin | Titanium oxide | Barium hydroxide | Diethyl polysiloxane |
| Photocatalytic coating B | Hydrolytic siloxane-based resin methyl silicate | Hydrophobic acrylic silicon resin | Sulfur-doped photocatalytic titanium oxide | Barium hydroxide | Diethyl polysiloxane |
| Photocatalytic coating C | Nafion | Fluoro-resin | Sulfur-doped photocatalytic titanium oxide | Barium hydroxide | Diethyl polysiloxane |
| | Hydrolytic siloxane-based resin methyl silicate | Hydrophobic silicone resin | — | — | — |
| Photocatalytic coating D | Nafion | Hydrophobic polyester resin | Titanium oxide | Barium hydroxide | Diethyl polysiloxane |
| Photocatalytic coating E | High-polymer | Hydrophobic polyester resin | Sulfur-doped photocatalytic titanium oxide | — | — | made between the coating surface P-5 and water is 15 degrees, the contact angle made between the coating surface P-6 and water is 65 degrees, the contact angle made between the coating surface P-7 and water is 25 degrees, contact angle made between the coating surface P-8 and water is 80 degrees, the contact angle made between the coating surface P-9 and water is 30 degrees, the *contact angle made between the coating surface P-10 and water is 70 degrees, the contact angle made between the coating surface P-11 and water is 60 degrees, and the contact angle made between the coating surface P-12 and water is 90 degrees.

After the above-mentioned treatment is applied, the wall surface is left for 8 months in a state where the factory is run, and the degree of gathering of mold is studied. The result of the degree of gathering of mold is shown in Table 10.

TABLE 10

|  |  | Degree of gathering of mold | | | | | |
|---|---|---|---|---|---|---|---|
|  |  | After 1 week | After 2 weeks | After 4 weeks | After 2 months | After 3 months | After 8 months |
| Photocatalytic coating A | P-1 | − | − | − | − | ± | ± |
|  | P-2 | − | − | − | − | − | − |
| Photocatalytic coating B | P-3 | − | − | − | − | ± | ± |
|  | P-4 | − | − | − | − | − | − |
| Photocatalytic coating C | P-5 | − | − | − | − | ± | ± |
|  | P-6 | − | − | − | − | − | − |
| Photocatalytic coating D | P-7 | − | − | − | ± | + | + |
|  | P-8 | − | − | − | − | ± | ± |
| Photocatalytic coating E | P-9 | − | + | ++ | ++ | +++ | +++ |
|  | P-10 | − | − | + | ++ | +++ | +++ |
| Control | P-11 | + | ++ | ++ | +++ | +++ | +++ |
|  | P-12 | + | + | ++ | +++ | +++ | +++ |

As can be understood from Table 10, with respect to the coating surfaces to which the control is applied, the slight gathering of mold is already confirmed at a point of time where 1 week elapses from the start of the test, and conspicuous gathering of mold is confirmed up to a point of time where 3 months elapse after the start of the test.

Next, with respect to the zones to which the photocatalytic coatings A to D are applied, it is understood that the gathering of mold is effectively suppressed over four weeks (approximately 1 month) after the start of the test.

Particularly, with respect to the coating surfaces to which the photocatalytic coatings A to C are applied, the gathering of mold is not found even after a lapse of 2 months. Further, with respect to the coating surfaces P-2, P-4, P-6 to which silane treatment is applied, the gathering of mold is not confirmed even after a lapse of 3 months.

Further, with respect to the coating surfaces P-1, P-3, P-5 to which the silane treatment using the photocatalytic coatings A to C is not applied, although a slight amount of adhesion material which cannot be determined to be mold or dirt is confirmed, the acquisition of an almost favorable antifungal effect is confirmed.

With respect to the wall surface to which the photocatalytic coating D is applied, on the coating surface P-7 to which silane treatment is not applied, although a slight amount of adhesion material is confirmed after 2 months and the growth of a slight amount of mold is confirmed after 3 months, it is understood that mold is effectively suppressed compared to the wall surface to which the control is applied.

Further, on the coating surface P-8 to which silane treatment is applied, the gathering of mold is not confirmed even after a lapse of 2 months. Although a slight amount of adhesion material is confirmed after a lapse of 3 months, it is understood that mold is effectively suppressed.

On the other hand, with respect to the photocatalytic coating E, although the gathering of mold is not confirmed at a point of time where 1 week elapses, the gathering of mold is confirmed on the coating surface P-9 to which silane treatment is not applied after a lapse of 2 weeks while the gathering of mold is confirmed on the coating surface P-10 to which silane treatment is applied after a lapse of 4 weeks.

Particularly, as a matter which is confirmed in common between the coating surface P-9 and the coating surface P-10, the deterioration of the coating surface is observed. It is thought that the deterioration of the coating surface is brought about by the erosion of the resin component of the photocatalytic coating E by the photocatalyst which is excited by the illumination in the factory.

From these results, it is understood that the photocatalytic coatings A to D of this embodiment are photocatalytic coatings where the coating per se is hardly eroded even when the photocatalyst is excited. It is also understood that the photocatalytic coatings A to D of this embodiment are photocatalytic coatings which can effectively suppress the gathering of mold by suitably adjusting the degree of the hydrophilicity of the coating surface.

As has been described heretofore, this embodiment provides the photocatalytic coating which contains a hydrophilic resin in which photocatalyst particles are dispersed and a hydrophobic resin having compatibility with the hydrophilic resin is provided, wherein the hydrophilic resin is formed using a tetrafluoro-ethylene-based resin obtained by graft polymerization of a sulfonic acid. Accordingly, the coating per se is hardly eroded even when the photocatalyst is excited, the coating surface having strong hydrophobic tendency can be formed, and the propagation of mold can be effectively suppressed by suitably adjusting the hydrophilicity of the coating surface.

Although the mold prevention performance test has been carried out using the respective photocatalytic coatings, it is needless to say that the respective photocatalytic coatings can also suppress the propagation of other organisms.

These photocatalytic coatings can acquire the effect of suppressing the propagation of organisms which are fond of living in water or organisms which are fond of moisture such as bacteria, algae group, algae and ameba, for example.

Further, places to which the photocatalytic coating is applied and a material of an object to which the photocatalytic coating is applied are not particularly limited.

For example, a caulking agent is filled in joint portions which are formed by arranging tiles and is solidified and, then, the photocatalytic coating may be applied to the caulking agent by coating.

By adopting such joint structure, it is possible to impart an outstanding antifungal effect to the joint portions. Further, there is no possibility that the caulking agent is eroded and hence, the durability of the joint portion is enhanced.

[4-1. Addition of Adsorbent to Photocatalytic Coating of this Embodiment]

Next, the study which has been made on an acetaldehyde decomposition effect of the photocatalytic coating of this embodiment acquired by the addition of an adsorbent is explained.

[4-2. Preparation of Photocatalytic Coating]

In this embodiment, a photocatalytic coating X3 of this embodiment (hereinafter, also referred to as "coating X3") which uses activated carbon as an adsorbent is prepared. Although the composition of the coating X3 is substantially equal to the composition of the above-mentioned coating X2-Cu6%, the coating X3 differs from the coating X2-Cu6% with respect to a point that the coating X3 contains 5 weight % of activated carbon therein.

[4-3. Acetaldehyde Decomposition Test]

A coating film is formed on a plastic plate on which a urethane coating film is formed in advance by applying the coating X3 to the plastic plate by coating. The plastic plate is placed under the acetaldehyde atmosphere in a sealed vessel. Then, a change of the concentration of acetaldehyde with time and a change of the concentration of carbon dioxide with time in such atmosphere are observed. A coating film which is formed of the coating X2-Cu6% which does not contain activated carbon is used as a control. The results are shown in FIG. 9A and FIG. 9B.

Figure 9A:
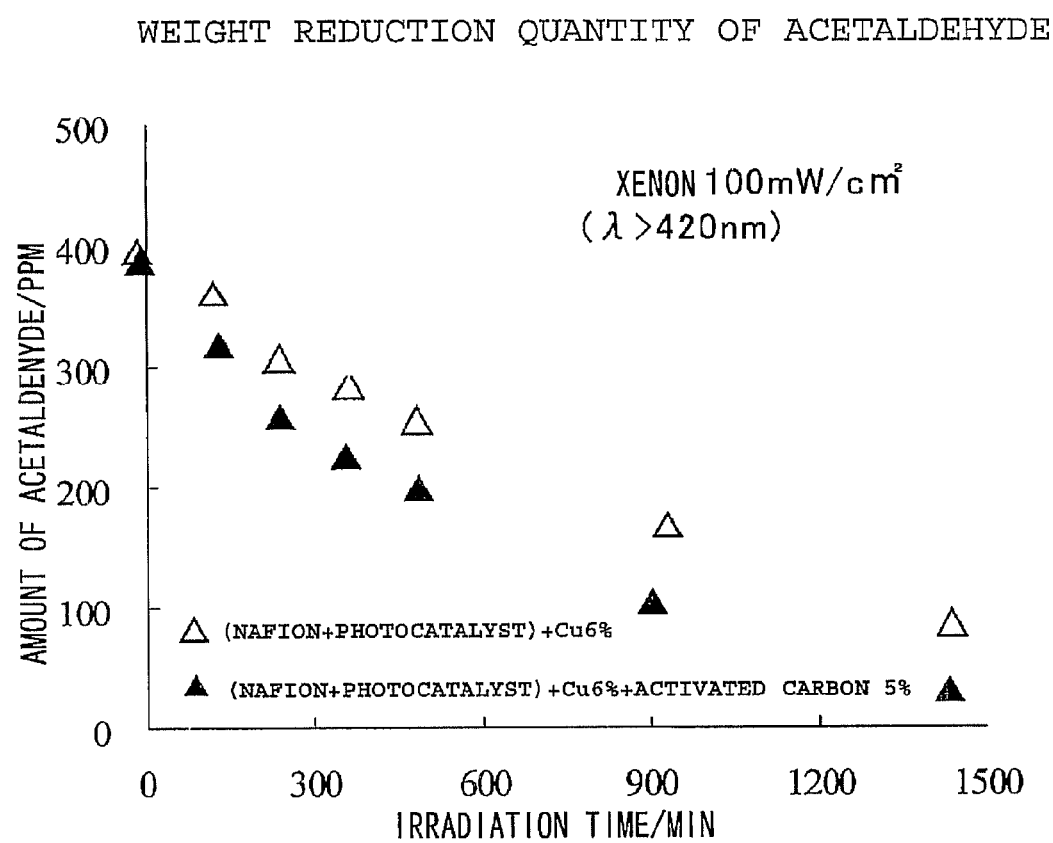
FIG. 9A is an explanatory view showing test data of the photocatalytic coating of this embodiment which contains an adsorbent.
Figure 9B:
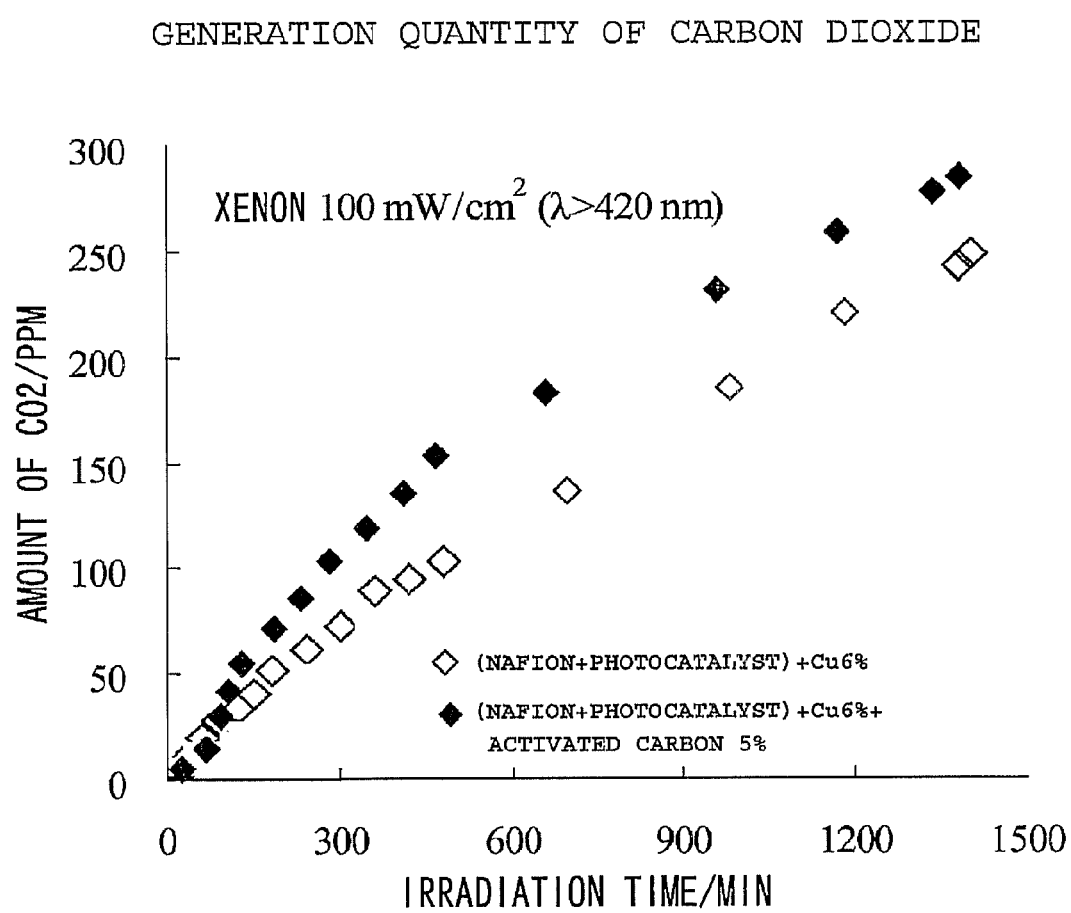
FIG. 9B is an explanatory view showing test data of the photocatalytic coating of this embodiment which contains an adsorbent.

As shown in FIG. 9A, it is understood that the coating film formed of the coating X3 efficiently decomposes acetaldehyde compared to the coating film formed of the coating X2-Cu6% which does not contain activated carbon. Further, with respect to carbon dioxide which is generated as a decomposed product of acetaldehyde, as shown in FIG. 9B, it is understood that an amount of carbon dioxide generated from the coating film formed of the coating X3 is larger than an amount of carbon dioxide generated from the coating film formed of the coating X2-Cu6% which does not contain activated carbon.

From the result of this test, it is understood that the adsorption function of the photocatalytic coating which contains the adsorbent of this embodiment is further enhanced.

[5-1. Application of Photocatalytic Coating of this Embodiment to Textile Product by Coating]

Conventionally, although there has been an extremely strong demand for the application of the photocatalytic function to a textile product, conventional techniques have many drawbacks including a drawback that a textile product is eroded by a photocatalyst. The conventional techniques also have a drawback that the application of the photocatalytic function to the textile product largely pushes up a cost.

On the other hand, as explained hereinafter, with the use of the photocatalytic coating of this embodiment, it is possible to provide a textile product imparted with high-performance photocatalytic ability at a low cost.

Particularly, in the photocatalytic coating of this embodiment, the photocatalyst is surrounded by Nafion and hence, Nafion is interposed between the fiber which constitutes the textile product and the photocatalyst. Accordingly, it is possible to avoid a possibility that the fiber and the photocatalyst are brought into direct contact with each other so that the fiber portion is decomposed.

Particularly, a binder in the photocatalytic coating of this embodiment is a Nafion high-polymer having a molecular weight of 200,000 and hence, when the photocatalytic coating is applied to a textile product, Nafion is brought into a state where Nafion is entangled with the fiber so that it is possible to prevent a coating film from being peeled off from the textile product. That is, even when the textile product is washed or the like, it is possible to prevent the peel-off of the coating film as much as possible thus maintaining a photocatalytic ability.

As a method of imparting photocatalytic ability to a textile product using the photocatalytic coating of this embodiment, two methods consisting of a method in which photocatalytic coating is impregnated into the textile product and a method in which a photocatalytic coating is applied to a surface of the textile product by coating, adhesion or adsorption are named.

For example, as a method of impregnating the photocatalytic coating into a paper product, for example, a method in which a photocatalytic coating is added to paper during a paper making step such that the photocatalytic coating is impregnated into the paper is named.

Further, as a method of impregnating the photocatalytic coating into a cloth product, for example, a method in which yarns to which a photocatalytic coating is applied in advance are interwoven is named.

Further, a method of applying a photocatalytic coating to paper by coating, adhesion or adsorption can be realized, for example, by performing a spray method, a painting method, an extruding method, a method of kneading a photocatalytic coating into a laminate resin, a method which uses a size press (a paper making machine with a size press)(on-machine), a paste method, a laminate method, printing or the like after a paper making step.

Further, a method of applying a photocatalytic coating to a cloth product by coating, adhesion or adsorption can be realized, for example, by performing a spray method which sprays the photocatalytic coating to the cloth product after the cloth product is manufactured.

[5-2. Verification of Antimicrobial Effect of Textile Product to which Photocatalytic Coating is Applied]

Next, the verification of an antimicrobial effect of a textile product to which a photocatalytic coating of this embodiment is applied is performed.

To be more specific, a paper product and a woven fabric product having water absorbing property are respectively mounted on a stainless steel plate, and the above-mentioned coating X2 is applied to a surface of the paper product and a surface of the woven fabric product by a spray method. A thickness of a coating film formed on the paper product and a thickness of a coating film formed on the woven fabric product are 5 µm respectively.

Further, as a control specimen, a sample in which a urethane coating film is formed on a stainless steel plate in advance, and the coating X2-Cu6% is applied to the urethane coating film and a thickness of the coating film which is formed of the coating X2-Cu6% is set to 1 µm is prepared. A sample in which a coating film has a thickness of 5 µm is also prepared in the same manner.

As the illumination condition, the bright condition and the dark condition are used. In the bright condition, the test is carried out under two conditions of 200±50Lux and 900±50 Lux using a fluorescent lamp (Mellow White FL10_NX made by Toshiba Inc).

Further, the test time is 8 hours at a room temperature, and 300 µl of culture solution of colon bacillius is dropped onto the coating film.

Further, the evaluation is made by calculating antimicrobial activity values using the following antimicrobial activity value calculation formula and by comparing these values.

Light irradiation antimicrobial activity value $R=[\log(B/A)]-[\log(C/A)]=[\log(B/C)]$.

Dark condition antimicrobial activity value $R=[\log(B'/A)]-[\log(C'/A)]=[\log(B'/C')]$.

In the formula, A is the number of viable bacteria on the blank immediately after inoculation, B is the number of viable bacteria on the blank after cultivation with irradiation of light, C is the number of viable bacteria on the specimen after cultivation with irradiation of light, B' is the number of viable bacteria on the blank after cultivation under dark condition, and C' is the number of viable bacteria on the specimen after cultivation under dark condition.

A, B, B' in the above-mentioned formula are set to values in the following Table 11.

TABLE 11

|   | 200 Lux | 900 Lux |
|---|---|---|
| A | $4.1 \times 10^5$ | $2.0 \times 10^5$ |
| B | $3.7 \times 10^5$ | $1.8 \times 10^5$ |
| B' | $1.7 \times 10^6$ | $2.2 \times 10^5$ |

*unit: cfu/ml

FIG. 10 shows the test result of this test. As can be understood from the result shown in FIG. 10, the coating film having a film thickness of 5 μm which is formed by using the coating X2-Cu6% to a paper product exhibits high antimicrobial activity in the same manner as the sample which is formed by applying the coating X2-Cu6% to the urethane coating film.

It is also found that the sample in which a coating film having a film thickness of 5 μm is formed on a cloth product using the coating X2 also exhibits the high antimicrobial activity although the antimicrobial activity is slightly lower than the antimicrobial activity of the sample which is formed by applying the coating X2-Cu6% to the urethane coating film.

In this manner, it is understood that the photocatalytic coating of this embodiment can impart the extremely effective antimicrobial property to a textile product by applying or impregnating the photocatalytic coating to the textile product.

[6-1. Applying Photocatalytic Coating of this Embodiment to Building Material]

A large number of coating products formed of coatings for building materials have been marketed. For example, as a coating used in a wooden building material, there have been known coatings which possess permeability, swelling tracing property and water repellency. However, a photocatalytic coating which imparts sufficient durability to a coating film has not yet been developed.

In view of the above, the inventors of the present invention have succeeded in the development of a building material which possesses high durability, not to mention photocatalytic ability, permeability, swelling tracing ability and water repellency by applying the photocatalytic coating of this embodiment to a building material by coating. The result of a test is explained hereinafter. In the test explained hereinafter, a building material which is formed of a wooden material (wooden building material) is used as a representative example of a building material which easily decays. However, the application of the invention to the building material made of metal, plastic or the like is not limited.

[6.2. Result of Weathering Deterioration Test Using Ultraviolet Rays or the Like]

A commercially available wooden material coating is applied to wooden materials, and a photocatalytic coating of this embodiment is applied to the wooden materials and, thereafter, the degree of enhancement of the durability of the wooden materials is evaluated using an SWOM test.

Three kinds of commercially available wooden material coatings used in the test are shown in the following Table 12.

TABLE 12

| No | Kind | Company name | Composition |
|---|---|---|---|
| 1 | HM65 (currently used) | Kansai Paint Co., Ltd. | Moisture-cured urethane (film forming type) |
| 2 | Guardlac aqua | WASHIN CHEMICAL INDUSTRY CO., LTD | Water-based acrylic emulsion half film forming type |
| 3 | Guardlac LX | WASHIN CHEMICAL INDUSTRY CO., LTD | Water-based acrylic emulsion permeable type |

Further, the respective commercially available wooden material coatings are applied in accordance with a following method. A photocatalytic coating is applied to respective samples at a rate of 50 mL/m², the photocatalytic coating is naturally dried at a temperature of approximately 25° C. for 14 days thus forming a coating film having a film thickness of approximately 5 μm. Coating HM65 is applied to the sample one time at a rate of 100 mL/m² and is dried. Guardlac aqua is applied to the sample one time at a rate of 100 mL/m² and is dried. Guardlac LX is applied to the sample one time at a rate of 100 mL/m² and is dried.

In this test, the coating X2-Cu6% which is previously described is used as the photocatalytic coating of this embodiment, and the coating Y1 which is described previously is used as a control-use photocatalytic coating. The test result is shown in Table 13.

TABLE 13

| SWOM test time | 800 hrs (corresponding to three years and half) | | | | | 1500 hrs (corresponding to six years and half) | | | | |
|---|---|---|---|---|---|---|---|---|---|---|
| | Gross reduction rate | | | | Degradation rate with | Gross reduction rate | | | | Degradation rate with |
| No | Kind/test item | Blank | specimen | Rate | ΔE | naked eyes | Blank | Specimen | Rate | ΔE | naked eyes |
| 1 | HM65 (currently used) | 2.0 | 0.8 | 0.4 | 26.2 | −5 | 3.2 | 1.3 | 0.4 | 33.3 | −5 |
| 2 | Guardlac aqua | 2.0 | 1.0 | 0.5 | 4.9 | −2 | 2.0 | 1.0 | 0.5 | 14.9 | −3 |

TABLE 13-continued

| | | 800 hrs (corresponding to three years and half) | | | | 1500 hrs (corresponding to six years and half) | | | | |
|---|---|---|---|---|---|---|---|---|---|---|
| SWOM test time | | Gross | | | Degradation | Gross | | | | Degradation |
| Kind/test | | reduction rate | | | rate with | reduction rate | | | | rate with |
| No | item | Blank | specimen | Rate | ΔE | naked eyes | Blank | Specimen | Rate | ΔE | naked eyes |
| 3 | Guardlac aqua + coating Y1 | 2.0 | 1.8 | 0.9 | 3.2 | −1.5 | 2.0 | 1.4 | 0.7 | 3.8 | −2 |
| 4 | Guardlac aqua + X2-Cu6% | 2.0 | 1.8 | 0.9 | 4.1 | −1.5 | 2.0 | 1.2 | 0.6 | 6.5 | −2 |
| 5 | Guardlac LX | 2.0 | 1.0 | 0.5 | 5.1 | −2 | 2.0 | 1.0 | 0.5 | 10.2 | −3 |
| 6 | Guardlac LX + coating Y1 | 2.0 | 1.8 | 0.9 | 6.1 | −1.5 | 2.0 | 1.4 | 0.7 | 7.6 | −2 |
| 7 | Guardlac LX + X2-Cu6% | 2.0 | 2.0 | 1.0 | 4.4 | −1.5 | 2.0 | 1.4 | 0.7 | 5.2 | −2 |

As can be also understood from Table 13, the durability of the wooden building material can be remarkably enhanced by applying the photocatalytic coatings of this embodiment to surfaces of the wooden building materials.

[6-3. Verification of Antifungal Effect on a Wooden Building Material to which the Photocatalytic Coating is Applied]

Next, a verification test of an antifungal effect of a wooden building material to which the photocatalytic coating of this embodiment is applied is carried out.

To be more specific, the above-mentioned coating X2-Cu6% is applied to a surface of a wooden building material by a spray method. As a film thickness, two kinds of film thickness, that is, 1 μm and 5 μm are used.

As an illumination condition, a bright condition and a dark condition are used. In the bright condition, the test is carried out under two conditions of 200±50 Lux and 900±50 Lux using a fluorescent lamp (Mellow White FL10 NX made by Toshiba Inc).

The test time is 8 hours at a room temperature, and 300 μl of culture solution of mold is dropped onto the coating film.

The evaluation is made by calculating antimicrobial activity values using a following antimicrobial activity value calculation formula and by comparing these values.

ntimicrobial activity value under light irradiation
$R=[\log(B/A)]-[\log(C/A)]=[\log(B/C)]$.

Antimicrobial activity value under dark condition
$R=[\log(B'/A)]-[\log(C'/A)]=[\log(B'/C')]$.

In the formula, A is the number of viable bacteria on a blank immediately after inoculation, B is the number of viable bacteria on a blank after cultivation with irradiation of light, C is the number of viable bacteria on a specimen after cultivation with irradiation of light, B' is the number of viable bacteria on a blank after cultivation under the dark condition, and C' is the number of viable bacteria on the specimen after cultivation under the dark condition.

A, B, B' in the above-mentioned formula are set to values shown in the following Table 14.

TABLE 14

| | 200 Lux | 900 Lux |
|---|---|---|
| A | $3.3 \times 10^5$ | $3.1 \times 10^5$ |
| B | $2.4 \times 10^5$ | $2.7 \times 10^5$ |
| B' | $3.5 \times 10^6$ | $4.2 \times 10^5$ |

*Unit: cfu/ml

FIG. 11 shows the test result of this test. As can be understood from the result shown in FIG. 11, the wooden building material to which the photocatalytic coating of this embodiment is applied exhibits high antifungal activity.

[6-4. Decay Resistance Test]

Next, a decay resistance test of a wooden building material to which the photocatalytic coating of this embodiment is applied is carried out using decay bacteria which decays the wooden material. The test is carried out based on JISK1571 which is prescribed in Japanese Industrial Standards. Here, the previously-described coating X2-Cu6% and coating Y2 are used as the photocatalytic coating. The test result is shown in FIG. 12.

As shown in FIG. 12, the following result is obtained. That is, the decay resistance can be enhanced by applying the photocatalytic coating of this embodiment to a Viewtac sealer clear by coating so that the wooden material is hardly decayed.

Further, the result of the SWOM test is also improved. As can be understood from these results, it is possible to provide wooden material coatings and wooden building materials which possess durability higher than ever.

[7. Application of Photocatalytic Coating of this Embodiment to in-Mold Molded Product]

In-mold molding is a molding method in which a coating is applied to a molded product from a die simultaneously with molding. Since the photocatalytic coating contributes to the enhancement of a function of a surface of an injection-molded product, it is thought that there arises necessity for a photocatalytic coating liquid in in-mold molding in the future.

There is no case where a photocatalytic coating is applied to in-mold molding so far. It is considered that the application of the photocatalytic coating to the in-mold molding is not realized because of following problems.

(1) The solid concentration of a coating liquid is low and hence, a solvent is evaporated in a die whereby the coating liquid cannot be directly applied to in-mold molding.

(2) A coating is applied to an injection-molded thermoplastic resin product by coating and hence, a guard layer against a photocatalyst becomes necessary whereby the formation of a plurality of thin film layers becomes necessary. Such formation of the plurality of thin film layers is technically difficult or pushes up a cost. Further, it is often the case that the guard layer is formed of an inorganic material and hence, matching between the guard layer and the coating liquid is improper.

(3) Although it is necessary to remove an injection-molded product from a die in performing in-mold molding, an upper layer of a photocatalytic coating film has no mold removal effect and hence, it is necessary to provide a die removal layer. However, the mold removal layer interrupts a photocatalytic effect.

Here, as a method for carrying out in-mold molding, five methods shown in Table 15 can be named.

TABLE 15

| 1 | Die lift IMC (initial stage) | Lift die after molding and inject coating into gap between die and molded product |
| 2 | High pressure IMC | Inject coating with pressure exceeding internal pressure of cavity without lifting die |
| 3 | Mold-coating method | Apply coating to die by spraying in advance |
| 4 | Sandwich molding method | Use powder coating as skin |
| 5 | Transfer forming method | Use thermal transfer film |

Firstly, the in-mold molding method which is suitable for the photocatalytic coating of this embodiment is studied. The result of the study is shown in Table 16.

TABLE 16

| | Moldability | Coating curability | Die removal property | injection-molded resin binding property |
|---|---|---|---|---|
| 1 Die lift IMC (initial stage) | Not moldable | | | |
| 2 High pressure IMC | Not moldable | | | |
| 3 Mold-coating method | Moldable | Good | Fair | Fair |
| 4 Sandwich molding method | Not moldable | | | |
| 5 Transfer forming method | Moldable | Good | Fair | Fair |

A solvent is evaporated in the method in which a coating is filled in a gap between the die and the molded product and hence, the application is this method is considered difficult. As a result, it is thought that the photocatalytic coating can be molded by in-mold molding using the mold-coating method 3 and the transfer forming method 5.

To apply a coating to in-mold molding, it is necessary to cure the coating within a short time at the time of molding. Nafion which is contained in the photocatalytic coating of this embodiment as a binder is a large high-polymer having a molecular weight of 200,000 and hence, a film is formed when a solvent is evaporated and a coating film is formed without incurring a curing reaction. Accordingly, Nafion has an advantage that the coating can be cured within a short time.

In a case of the conventional coating, a removal layer is required between the coating and the die when the molding method with a prefix 3 is adopted, and a removal layer is required between the coating and the transfer film when a molding method with a prefix 5 is adopted. Further, the coating is required to exhibit binding property with a molded resin on a side of the molded product and hence, a primer layer is also required. Accordingly, it is necessary to form coating having at least three coating layers or to perform a coating operation three times.

Figure 13:
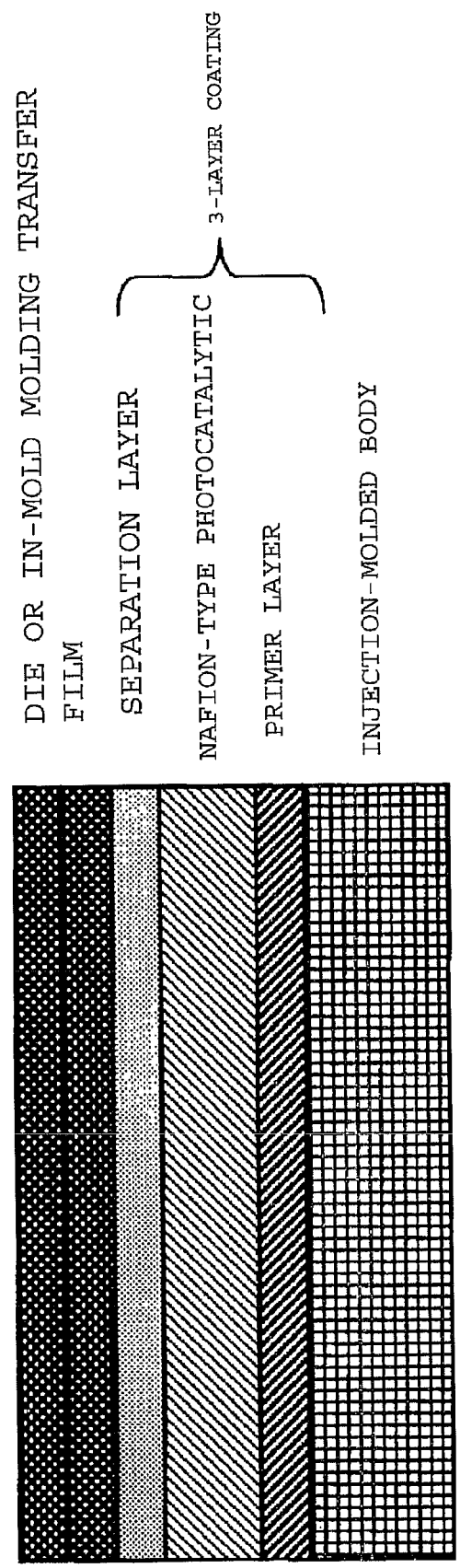
FIG. 13 is an explanatory view showing the structure of a coating film in in-mold molding.

According to the photocatalytic coating of this embodiment, however, the molding can be performed with one coating, that is, by performing a coating operation one time. Particularly, when a hydrophobic resin having smaller surface tension than the Nafion-based photocatalytic coating is used, a layer is formed on an upper side of the resin thus exhibiting a removal effect. To the contrary, when a hydrophobic resin having larger surface tension than the Nafion-based photocatalytic coating is used, a layer is formed on an upper side of the resin. Further, as a hydrophobic resin to be used, it is necessary to select a resin which exhibits a primer effect. To be more specific, the above-mentioned advantageous effects can be realized by adopting the structure of the coating film shown in FIG. 13.

Here, a preparation method of the photocatalytic coating of this embodiment suitable for in-mold molding is explained. 0.3 L of Nafion DE2020 (made by E.I. du Pont de Nemours & Company) is dispensed in a stainless steel vessel having a capacity of 2 L, 60 g of Cu-carrying sulfur-doped photocatalytic titanium oxide (product made by Toho Titanium Co., Ltd) is filled in the vessel and, further, 0.3 L of N-propanol is added as a solvent and 2 g of $[Cu(NH_3)_4](OH)_2$ is added as a neutralizing agent. These components and pigment dispersing glass beads are mixed with each other and, thereafter, the mixture is stirred at a temperature of 20° C. for 120 minutes using a stirrer.

Next, titanium oxide is sufficiently stirred and, thereafter, 0.05 L of vinylidene fluoride-propylene hexafluoride copolymer (KYNAR: product made by Tokyo Zairyo Co., Ltd.) and 0.01 L of a low-molecular epoxy resin are added to the stirred mixture, and the mixture is further stirred at a temperature of 20° C. for 3 minutes.

By forming the photocatalytic coating having such composition, it is possible to form a coating film having the structure where a (hydrophobic Nafion+6% Cu-carrying S-doped photocatalyst) layer is formed at a center portion of the coating film, a vinylidene fluoride-propylene hexafluoride copolymer layer which plays a role of separating the photocatalytic coating from the film is formed on the (hydrophobic Nafion+6% Cu-carrying S-doped photocatalyst) layer, and a low-molecular epoxy resin layer which supports the bonding of the photocatalytic coating with an injection molded body is formed below the (hydrophobic Nafion+6% Cu-carrying S-doped photocatalyst) layer. Further, the (hydrophobic Nafion+6% Cu-carrying S-doped photocatalyst) layer, the vinylidene fluoride-propylene hexafluoride copolymer layer formed on the (hydrophobic Nafion+6% Cu-carrying S-doped photocatalyst) layer, and the low-molecular epoxy resin layer formed below the (hydrophobic Nafion+6% Cu-carrying S-doped photocatalyst) layer are gradually formed with concentration gradients respectively.

In this manner, according to the photocatalytic coating of this embodiment, three layers can be formed with one coating operation and hence, it is possible to perform the in-mold molding with the photocatalytic coating while remarkably reducing labor.

[Laminated Coating Film Structure]

Next, the laminated coating film structure of this embodiment is explained.

The sterilizing effect of the photocatalyst does not generate resistance in bacteria or mold so that the sterilizing effect exhibits an excellent effect on various kinds of bacteria or mold. However, when the number of viable bacteria per unit area on a surface to which the photocatalytic coating is applied is large (for example, approximately $10^6$ to $10^8$ cfu/cm$^2$), there has been a case where the sterilizing of bacteria cannot catch up with the gathering of bacteria so that it is difficult to acquire the sufficient bacteria sterilizing effect.

In view of the above, the present invention provides the laminated coating film structure which includes; an antimicrobial coating film which is formed of an antimicrobial coating containing an antimicrobial component; and a photocatalytic coating film formed on a surface of the antimicrobial coating film, wherein the photocatalytic coating film is formed of a photocatalytic coating prepared by dispersing or dissolving at least a photocatalyst, a tetrafluoro-ethylene-based resin obtained by graft polymerization of a sulfonic acid, a compound containing metal ion having an ionic radius not less than an ionic radius of calcium and/or complex ion having an ionic radius not less than the ionic radius of calcium into a solvent. That is, the present invention provides the laminated coating film structure in which the antimicrobial coating film constitutes a lower layer and the photocatalytic coating film constitutes an upper layer.

Here, the antimicrobial coating is not particularly limited provided that a coating can generate a sterilizing effect against bacteria and mold.

To be more specific, by selecting at least one of a dimethylphenylsulfamide-based antimicrobial agent, a benzimidazole-based antimicrobial agent, a trihalomethylthiocompound-based antimicrobial agent, and a silver-zeolite-based antimicrobial agent as an antimicrobial component which the antimicrobial coating contains, and by allowing the antimicrobial component to pass through a photocatalytic coating film described later, it is possible to allow the antimicrobial component to efficiently exhibit an antimicrobial effect.

Further, an adsorbent may be added to the antimicrobial coating. That is, the adsorbent may be disposed in a dispersed manner in the antimicrobial coating film formed of the antimicrobial coating.

As the adsorbent added to the antimicrobial coating, in the same manner as an adsorbent which is antecedently added to the photocatalytic coating, an inorganic adsorbent, a carbonaceous adsorbent, an organic adsorbent and the like can be named.

Further, the photocatalytic coating which constitutes the laminated coating film structure of this embodiment is the photocatalytic coating of the previously-mentioned embodiment which is prepared by dispersing or dissolving a photocatalyst, a tetrafluoro-ethylene-based resin obtained by graft polymerization of a sulfonic acid, hydroxide of metal having an ionic radius not less than an ionic radius of calcium and/or complex ion having an ionic radius not less than the ionic radius of calcium into a solvent.

In the laminated coating film structure according to the present invention, the photocatalytic coating film is formed on the surface of the antimicrobial coating film by applying the photocatalytic coating on the surface of the antimicrobial coating film thus constituting the laminated coating film structure consisting of the antimicrobial coating film and the photocatalytic coating film. Accordingly, it is possible to provide the laminated coating film structure which can exhibit a photocatalytic effect while possessing water repellency and also can exhibit an excellent antimicrobial effect.

To be more specific, when the coating structure uses only the antimicrobial coating film, although the antimicrobial effect is acquired, there exists a possibility that chemical resistance bacteria are generated thus giving rise to a drawback that the antimicrobial effect which lasts for a long time is not expected.

On the other hand, although the photocatalytic coating may obviate such a drawback on resistance bacteria, the sterilization of the photocatalytic coating cannot catch up with a large amount of bacteria and mold thus giving rise to a case where it is difficult to acquire a sufficient antimicrobial effect.

To overcome these drawbacks, a coating film may be formed by adding an antimicrobial component to a photocatalytic coating. In an actual operation, however, when the photocatalyst is excited upon reception of light, the antimicrobial component in the coating film is decomposed so that a sufficient antimicrobial effect cannot be acquired.

By adopting the laminated coating film structure in which the antimicrobial coating film constitutes a lower layer and the photocatalytic coating film constitutes an upper layer, it is thought that the decomposition of the antimicrobial component in the coating film by the photocatalyst can be prevented. However, in the conventional photocatalytic coating, the network structure which is formed of high-polymer chains of a resin contained in the coating is extremely dense and hence, it is impossible for the antimicrobial component in the lower layer to pass through the photocatalytic coating film constituting the upper layer and to be dispersed from the surface of the photocatalytic coating film.

The present invention can overcome these drawbacks by the photocatalytic coating having the above-mentioned constitution.

Next, the preparation of the laminated coating film structure and various kinds of test are explained hereinafter.

[8-1. Preparation of Photocatalytic Coating]

As the photocatalytic coating which can be used in the laminated coating film structure of this embodiment, any one of the above-mentioned photocatalytic coatings X1 to X6 of this embodiment or any one of the photocatalytic coatings A to D of this embodiment can be used. As a representative photocatalytic coating, the above-mentioned photocatalytic coating X1 is prepared. Since the specific preparation method is described above, the explanation of the preparation method is omitted.

[8-2. Preparation of Antimicrobial Coating]

Antimicrobial coating W1 used in the laminated coating film structure:

16 L of acrylic emulsion based coating (made by KIKUSUI Chemical Industries Co., Ltd.) is dispensed in a stainless steel vessel having a capacity of 20 L, 320 g of dimethyl phenylsulfamide based antimicrobial agent (made by Epro Co., Ltd.) is added in the vessel as an antimicrobial component. These components and pigment dispersing glass beads are mixed with each other and, thereafter, the mixture is stirred at a temperature of 20° C. for 120 minutes using a stirrer thus preparing the antimicrobial coating W1.

[8-3. Formation of Laminated Coating Film Structure]

The antimicrobial coating W1 is applied to a stainless steel plate having a longitudinal size of 50 mm, a lateral size of 100 mm and a thickness of 0.6 mm, and baking is performed at a temperature of 160° C. for 20 minutes thus forming an antimicrobial coating film. A thickness of the antimicrobial coating film is 50 μm. Next, the coating X1 is applied to the antimicrobial coating film and baking is performed at a temperature of 130° C. for 5 minutes thus forming a laminated coating film V1 on the stainless steel plate. A thickness of the photocatalytic coating film formed of the coating X1 is 5 μm. The stainless steel plate on which the laminated coating film V1 is formed is used as a sample WX11.

[8-4. Formation of Sample as a Control for Water Repellency Test]

The antimicrobial coating W1 is applied to a stainless steel plate having a longitudinal size of 50 mm, a lateral size of 100 mm and a thickness of 0.6 mm, and baking is performed at a temperature of 160° C. for 20 minutes thus forming an antimicrobial coating film. A thickness of the antimicrobial coating film is 50 μm. Next, commercially available photocatalytic coating is applied to the antimicrobial coating film and baking is performed at a temperature of 130° C. for 5 minutes thus forming a laminated coating film on the stainless steel plate.

By using a photocatalytic coating J1 (made by TOTO Ltd.), a photocatalytic coating J2 (made by NIHON TOKUSHU TORYO CO., LTD.), a photocatalytic coating J3 (made by ISHIHARA SANGYO KAISHA, LTD.) as commercially available photocatalytic coatings, three kinds of laminated coating films U1, U2, U3 having different photocatalytic coating films are formed. All photocatalytic coating films formed of the commercially available photocatalytic coating have a thickness of 5 μm. A control sample WJ11 is prepared by forming the laminated coating film U1 on the stainless steel plate, a control sample WJ12 is prepared by forming the laminated coating film U2 on the stainless steel plate, and a control sample WJ13 is prepared by forming the laminated coating film U3 on the stainless steel plate.

[8-5. Water Repellency Test of Laminated Coating Film]

Next, a water repellency test of a surface of a laminated coating film V1 which is formed on the sample WX11 is performed. The test is performed by spraying water on the laminated coating film V1 under a bright condition and by observing the behavior of water. As controls, the above-mentioned control sample WJ11, control sample WJ12, control sample WJ13 are used. A test result is shown in Table 17.

TABLE 17

| Item | Sample WX11 | Control sample WJ11 | Control sample WJ12 | Control sample WJ13 |
|---|---|---|---|---|
| Photocatalyst 200phs | S-doped photocatalyst | $TiO_2$ | $TiO_2$ | $TiO_2$ |
| Binder | Nafion | Silicate-based | Silicate-based | Silicate-based |
| Solvent | Isopropanol | Isopropanol | Isopropanol | Isopropanol |
| Water spray | Water membrane shrunken | Water membrane formed | Water membrane formed | Water membrane formed |
| Hydrophilic/hydrophobic | Hydrophobic | Hydrophilic | Hydrophilic | Hydrophilic |
| Dynamic contact angle | 47° | Not measurable | Not measurable | Not measurable |

As can be understood also from Table 17, on a surface of the laminated coating film V1 of the sample WX11, a water membrane is shrunken so that outstanding hydrophobic tendency is confirmed. Here, a dynamic contact angle is 47°. On the other hand, on a surface of the laminated coating film U1 of the control sample WJ11 which constitutes a control, a water membrane is not shrunken and is held in a thinly spread state, and the outstanding hydrophilic tendency which is peculiar to the photocatalyst is observed. In this sample, a dynamic contact angle cannot be measured. In the same manner, also with respect to the control sample WJ12 and the control sample WJ13, outstanding hydrophilic tendency is observed, while dynamic contact angles cannot be measured. It is understood from the above result that the laminated coating film V1 exhibits outstanding hydrophobic tendency compared to the coating film formed of a general photocatalytic coating.

[8-6. Verification Test of Antimicrobial Effect of Laminated Coating Film]

Next, an antimicrobial effect test of the formed laminated coating film V1 surface is performed. The test is performed by dropping 300 μl of a colon bacillius liquid of bacterial culture containing viable bacteria of $10^5$ order per 1 ml (hereinafter, referred to as low concentration bacterial culture) or bacterial culture containing viable bacteria of $10^8$ order per 1 ml (hereinafter, referred to as high concentration bacterial culture) on the coating film of a sample or a control sample and by measuring the number of viable bacteria after 24 hours. As a control, in addition to the previously-mentioned control sample WJ11, following respective control samples are also used.

Control Sample NJ01:

A commercially available photocatalytic coating J1 is applied to a stainless steel plate having a longitudinal size of 50 mm, a lateral size of 100 mm and a thickness of 0.6 mm, and baking is performed at a temperature of 130° C. for 5 minutes thus forming the photocatalytic coating film formed of the photocatalytic coating J1 on the stainless steel plate. A film thickness of the photocatalytic coating film formed of the photocatalytic coating J1 is 5 μm.

Control Sample NX01:

The previously-mentioned photocatalytic coating X1 is applied to a stainless steel plate having a longitudinal size of 50 mm, a lateral size of 100 mm and a thickness of 0.6 mm, and baking is performed at a temperature of 130° C. for 5 minutes thus forming the photocatalytic coating film formed of the coating X1 on the stainless steel plate. A thickness of the photocatalytic coating film formed of the coating X1 is 5 μm.

The evaluation is made by calculating antimicrobial activity values using a following antimicrobial activity value calculation formula and by comparing these values.

Antimicrobial activity value $R=[\log(B/A)]-[\log(C/A)]=[\log(B/C)]$

In the formula, A indicates the number of viable bacteria immediately after the inoculation of blank, and B indicates the number of viable bacteria after cultivation on a blank under light irradiation, and C indicates the number of viable bacteria after cultivation on the specimen under light irradiation.

A test result of the antimicrobial effect test performed by using the above-mentioned sample WX11 and the control samples WJ11, NJ01, NX01 is shown in Table 18. In Table 18, values of the respective samples indicate antimicrobial activity values R.

TABLE 18

| Number of viable bacteria after cultivation on blank (B) | Sample WX11 | Control sample WJ11 | Control sample NJ01 | Control sample NX01 |
|---|---|---|---|---|
| $5 \times 10^5$ cfu/ml | 4.2 $(3 \times 10^1)$ | 2.8 $(7 \times 10^3)$ | 2.1 $(4 \times 10^3)$ | 3.8 $(7 \times 10^1)$ |
| $5 \times 10^8$ cfu/ml | 5.4 $(2 \times 10^3)$ | 1.4 $(2 \times 10^7)$ | 1.2 $(3 \times 10^7)$ | 2.7 $(1 \times 10^6)$ |

As can be also understood from Table 18, the surface of the laminated coating film V1 of the sample WX11 exhibits a sufficient antimicrobial effect against the high concentration bacterial culture, not to mention that the surface of the laminated coating film V1 of the sample WX11 exhibits excellent antimicrobial activity against the low concentration bacterial culture. To the contrary, although the control sample WJ11 exhibits slight antimicrobial effect against the low concentration bacterial culture, the antimicrobial effect of the control sample WJ11 is not comparable to the antimicrobial effect of the sample WX11, and there is observed a phenomenon that an antimicrobial activity value of the control sample WJ11 against the high concentration bacterial culture is further lowered compared to the antimicrobial activity value of the control sample WJ11 against the low concentration bacterial culture. It is thought that the reason that the control sample WJ11 cannot exhibit the sufficient antimicrobial effect even though the control sample WJ11 includes the antimicrobial coating film lies in that the commercially available photocatalytic coating J1 prevents the exposure of the antimicrobial component contained in the antimicrobial coating film to the outside. Since the control sample NJ01 does not include an antimicrobial coating film, the antimicrobial activity value against the low concentration bacterial culture is held at 2.1 and the antimicrobial activity value against the high concentration bacterial culture is held at 1.2. Although the control sample NX01 does not include an antimicrobial coating film, the result shows that the control sample NX01 exhibits high antimicrobial activity against the low concentration bacterial culture compared to the control sample WJ11 and the control sample NJ01. This result suggests a high antimicrobial activity of a photocatalytic coating film formed of a photocatalytic coating X1 which is described in detail later or a coating obtained by partially changing the composition of the photocatalytic coating X1. However, the antimicrobial activity of the control sample NX01 against the high concentration bacterial culture is not comparable to the antimicrobial activity of the sample WX11 against the high concentration bacterial culture. It is thought that this is derived from a fact that the control sample NX01 does not include the antimicrobial coating film.

[8-7. Antimicrobial Effect Verification Test Based on Difference in Antimicrobial Component]

Next, using the sample WX11 which exhibits the most favorable antimicrobial activity in the above-mentioned [8-6. antimicrobial effect verification test of laminated coating film] as the reference, the verification of the antimicrobial effect is performed by replacing the antimicrobial component used in the sample WX11 with other components. The following samples are used in the verification besides the sample WX11.

Sample WX21:
The antimicrobial coating W2 is prepared by adding a benzimidazole-based antimicrobial agent (product of SAN-AI OIL Co., Ltd.) to the antimicrobial coating W1 as antimicrobial component in place of the antimicrobial component added to the antimicrobial coating W1. The sample WX21 is prepared in the same manner as the sample WX11 using the antimicrobial coating W2.

Sample WX31:
The antimicrobial coating W3 is prepared by adding a trihalomethylthio compound-based antimicrobial agent (product of Bayer Holding Ltd.) to the antimicrobial coating W1 as antimicrobial component in place of the antimicrobial component added to the antimicrobial coating W1. The sample WX31 is prepared in the same manner as the sample WX11 using the antimicrobial coating W3.

Sample WX41:
The antimicrobial coating W4 is prepared by adding a silver zeolite-based antimicrobial agent (product of CINANEN ZEOMIC CO., LTD.) to the antimicrobial coating W1 as antimicrobial component in place of the antimicrobial component added to the antimicrobial coating W1. The sample WX41 is prepared in the same manner as the sample WX11 using the antimicrobial coating W4.

The verification of the antimicrobial effect is performed using the above-mentioned sample WX11, sample WX21, sample WX31 and sample WX41 in the same manner as the above-mentioned [8-6. Test for verifying antimicrobial effect of laminated coating film]. Amounts of respective antimicrobial components in the antimicrobial coating film are set such that all samples exhibit the substantially equal antimicrobial activity value when the low-concentration bacterial culture and the high-concentration bacterial culture are dropped on the respective antimicrobial coating films to which a photocatalytic coating film is not formed. The result of the test is shown in Table 19. In Table 19, the values of the respective samples indicate antimicrobial activity values R, and values in parenthesis indicate the number of viable bacteria (cfu/ml) after the test.

TABLE 19

| Number of viable bacteria after blank culture | Sample WX11 | Sample WX21 | Sample WX31 | Sample WX41 |
| --- | --- | --- | --- | --- |
| $5 \times 10^5$ cfu/ml | 4.2 ($3 \times 10^1$) | 4.1 ($4 \times 10^1$) | 4.2 ($3 \times 10^1$) | 3.9 ($6 \times 10^1$) |
| $5 \times 10^8$ cfu/ml | 5.4 ($2 \times 10^3$) | 5.2 ($3 \times 10^3$) | 5.4 ($2 \times 10^3$) | 4.8 ($7 \times 10^3$) |

As shown in Table 19, all samples used in the verification exhibit the more favorable antimicrobial activity with respect to the antimicrobial activity value of the high-concentration bacterial culture which exceeds the antimicrobial activity value with respect to low-concentration bacterial culture. From this result, it is found that the photocatalytic coating film foamed of the photocatalytic coating X1 described in detail later can favorably expose various antimicrobial components. Table 19 suggests that the coating which is formed by partially changing the composition of the photocatalytic coating X1 can also favorably expose the various antimicrobial components. Although not shown in the table, the verification is performed with respect to antimicrobial activity when the photocatalytic coating films are formed of a commercially available photocatalytic coating J1 in place of the photocatalytic coating X1. All photocatalytic coating films exhibit the substantial same result as the control example WJ11 described in [1-5. Test for verifying antimicrobial effect of laminated coating film] and no favorable antimicrobial activity is recognized.

[8-8. Verification of Adsorption Power when an Adsorbent is Mixed into Antimicrobial Coating Film]

Next, odor-component adsorption power when various adsorbents are mixed into various antimicrobial coating films is verified using the sample WX11 as the reference.

The test is carried as follows. Methyl mercaptan is injected into air in a hermetic acrylic vessel having an inner capacity of 5 L such that the concentration of methyl mercaptan becomes 1.5 ppm. A sample described later is inserted into the inside of the vessel and, thereafter, the vessel is immediately placed in a dark room in a stationary state. A change of concentration of methyl mercaptan with time is measured.

The concentration of methyl mercaptan is measured using a methyl mercaptan detection tube (product number: NO, 70 L) made by GASTEC Inc.

In the verification, the following samples are used in addition to sample WX11. Amounts of respective adsorbents used in the antimicrobial coating films are added such that all samples exhibit the substantially same concentration of methyl mercaptan after a lapse of 24 hours when the respective samples on which the photocatalytic coating film is not formed and only the antimicrobial coating film is formed are used in the test.

Sample WX51:

An antimicrobial coating W5 is prepared by adding silica gel (product of FUJI SILYSIA CHEMICAL LTD.) which is classified as an inorganic adsorbent to the antimicrobial coating W1 as an adsorbent. The sample WX51 is prepared using the antimicrobial coating W5 in the same manner as the sample WX11.

Sample WX61:

An antimicrobial coating W6 is prepared by adding activated carbon (product of Japan EnviroChemicals, Ltd.) which is classified as a carbon-based adsorbent to the antimicrobial coating W1 as an adsorbent. The sample WX61 is prepared using the antimicrobial coating W6 in the same manner as the sample WX11.

Sample WX71:

An antimicrobial coating W7 is prepared by adding a plant adsorbent (product of Plaisir Corporation) which is classified as an organic adsorbent to the antimicrobial coating W1 as an adsorbent. The sample WX71 is prepared using the antimicrobial coating W7 in the same manner as the sample WX11.

Sample WJ51:

The sample WJ51 is prepared in the same manner as the sample WX11 using the above-mentioned antimicrobial coating W5 and the commercially available photocatalytic coating J1.

The result of the verification using the above-mentioned sample WX11, sample WX51, sample WX61, sample WX71 and sample WJ51 is shown in Table 20.

TABLE 20

|  | Sample WX11 | Sample WX51 | Sample WX61 | Sample WX71 | Control sample WJ51 |
|---|---|---|---|---|---|
| 0 hour | 1.5 | 1.5 | 1.5 | 1.5 | 1.5 |
| 1 hour | 1.0 | 0.8 | 0.8 | 0.9 | 1.4 |
| 2 hours | 0.9 | 0.8 | 0.8 | 0.8 | 1.4 |
| 3 hours | 0.9 | 0.7 | 0.6 | 0.7 | 1.3 |
| 4 hours | 0.7 | 0.4 | 0.5 | 0.5 | 1.0 |
| 12 hours | 0.6 | 0.4 | 0.3 | 0.4 | 0.8 |
| 24 hours | 0.5 | 0.3 | 0.3 | 0.2 | 0.8 |

(ppm)

As shown in Table 20, all of sample WX51, sample WX61 and sample WX7 exhibit favorable adsorption effects which exceed the adsorption effect of the sample WX11 which does not contain the adsorbent. It is understood from this result that odor components are adsorbed by the adsorbent contained in the antimicrobial coating film by way of the photocatalytic coating film formed of the photocatalytic coating X1.

From the results described in [8-5. Water repellency test of laminated coating film] to [8-8. verification of adsorption power when an adsorbent is mixed into antimicrobial coating film], it is understood that the laminated coating film structure of this embodiment can acquire, not to mention that the laminated coating film structure acquires the excellent antimicrobial effect compared to the conventional photocatalytic coating, the more excellent antimicrobial effect compared to a case where the photocatalytic coating film formed of the photocatalytic coating of this embodiment is used in a single layer.

That is, the laminated coating film structure of this embodiment is formed using the photocatalytic coating of this embodiment and hence, even when the photocatalyst is excited, the coating per se is hardly eroded and the coating surface having strong hydrophobic tendency can be formed. Further, antimicrobial components in the lower layer pass through the photocatalytic coating film which constitutes the upper layer and are dispersed from the surface of the photocatalytic coating film so that the laminated coating film structure can exhibit the excellent antimicrobial power.

Finally, the explanation of the above-mentioned respective embodiments is made to exemplify merely one example of the present invention, and the present invention is not limited by the above-mentioned embodiments. Accordingly, it is needless to say that, besides the above-mentioned respective embodiments, various modifications are conceivable depending on designs without departing from the technical concept of the present invention.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A hydrophobic photocatalytic coating comprising:
    a photocatalyst,
    a tetrafluoro-ethylene-based resin graft polymerized with a sulfonic acid, and
    an agent for neutralizing sulfo groups of said sulfonic acid, comprising a compound containing a metal ion or a complex ion, said ion having an ionic radius not less than the ionic radius of calcium, wherein the neutralizing agent is present at between 0.01% and 3.3% by weight with respect to the graft polymerized resin.

2. The photocatalytic coating according to claim 1, wherein the compound containing a metal ion is at least one selected from the group consisting of a hydroxide, a compound having an inorganic anion as a counter ion, a hydride, a nitride and an oxide.

3. The photocatalytic coating according to claim 2, wherein the compound containing a metal ion is selected from the group consisting of calcium hydroxide, barium hydroxide, potassium hydroxide and a mixture of the hydroxides.

4. The photocatalytic coating according to claim 1, wherein said compound contains a tetraamine copper complex ion.

5. The photocatalytic coating according to claim 1, wherein said photocatalyst is six (6) percent (%) by weight or more copper.

6. The photocatalytic coating according to claim 4, wherein said copper in the photocatalytic coating is contained at a rate of 6% by weight or more.

7. The photocatalytic coating according to claim 1, wherein the photocatalytic coating further contains a hydrophobic resin selected from the group consisting of a fluoro-resin, an acrylic silicon resin and a vinyl chloride resin.

8. The photocatalytic coating according to claim 1, wherein the photocatalytic coating further comprises an adsorbent having porosity, said adsorbent being selected from the group consisting of silica gel, activated alumina, zeolite, aluminophosphate-type molecular sieve, activated carbon and carbon molecular sieve.

9. A photocatalytic coating film formed of the photocatalytic coating according to claim 1.

10. A textile product comprising the photocatalytic coating according to claim 1.

11. A building material comprising the photocatalytic coating according to claim 1.

12. An in-mold injection molded product comprising the photocatalytic coating according to claim 1.

13. The photocatalytic coating according to claim 1, wherein the photocatalyst is a metal-oxide-based substance selected from the group consisting of titania, an iron oxide, a copper oxide, a tungsten oxide, a lithium titanate, and a strontium titanate.

14. The photocatalytic coating according to claim 1, wherein the photocatalyst is contained at a rate in the range of 0.1% by weight to 50.0% by weight of the photocatalytic coating.

15. The photocatalytic coating according to claim 1, wherein the tetrafluoro-ethylene-based resin is contained at a rate in the range of 0.5% by weight to 90.0% by weight of the photocatalytic coating.

16. The photocatalytic coating according to claim 1, wherein the photocatalytic coating contains 0.01% by weight to 10.0% by weight of said compound.

17. The photocatalytic coating according to claim 1, wherein the complex ion is contained at a rate in the range of 0.01% by volume to 10.0% by volume of the tetrafluoro-ethylene-based resin graft-polymerized with the sulfonic acid.

18. The photocatalytic coating according to claim 7, wherein the hydrophobic resin is contained in the photocatalytic coating at a rate in the range of 2% by weight to 40% by weight.

* * * * *